(12) United States Patent
    Miura

(10) Patent No.: US 10,565,124 B2
(45) Date of Patent: Feb. 18, 2020

(54) MEMORY SYSTEM AND METHOD FOR CONTROLLING NONVOLATILE MEMORY

(71) Applicant: Toshiba Memory Corporation, Minato-ku (JP)

(72) Inventor: Takashi Miura, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/119,713

(22) Filed: Aug. 31, 2018

(65) Prior Publication Data

US 2019/0286570 A1    Sep. 19, 2019

(30) Foreign Application Priority Data

Mar. 16, 2018  (JP) ................. 2018-049897

(51) Int. Cl.
    *G06F 12/1009*    (2016.01)
    *G06F 12/0811*    (2016.01)

(52) U.S. Cl.
    CPC ...... *G06F 12/1009* (2013.01); *G06F 12/0811* (2013.01); *G06F 2212/1024* (2013.01); *G06F 2212/2022* (2013.01); *G06F 2212/401* (2013.01); *G06F 2212/604* (2013.01); *G06F 2212/7201* (2013.01)

(58) Field of Classification Search
    None
    See application file for complete search history.

(56) References Cited

U.S. PATENT DOCUMENTS

| | | | |
|---|---|---|---|
| 8,285,916 B2 | 10/2012 | Nishihara et al. | |
| 9,047,177 B2 | 6/2015 | Matsudaira et al. | |
| 2008/0055323 A1* | 3/2008 | Franaszek | G06F 12/0897 345/530 |
| 2015/0169465 A1* | 6/2015 | Slepon | G06F 12/1009 711/103 |
| 2017/0177497 A1 | 6/2017 | Chun et al. | |
| 2017/0315927 A1* | 11/2017 | Loh | G06F 12/1027 |

FOREIGN PATENT DOCUMENTS

| | | |
|---|---|---|
| JP | 5130646 | 1/2013 |
| JP | 2013-196115 | 9/2013 |

* cited by examiner

*Primary Examiner* — Michael Alsip
(74) *Attorney, Agent, or Firm* — Oblon, McClelland, Maier & Neustadt, L.L.P.

(57) ABSTRACT

According to one embodiment, a memory system executes, when first address translation data including a first physical address indicating a physical storage location of the nonvolatile memory where data corresponding to a first logical address specified by a host is stored does not exist in a first cache and first compressed address translation data corresponding to the first address translation data exists in a second cache, an operation for storing uncompressed address translation data obtained by decompressing the first compressed address translation data in the second cache in the first cache and an operation for acquiring the first physical address from the uncompressed address translation data.

11 Claims, 12 Drawing Sheets

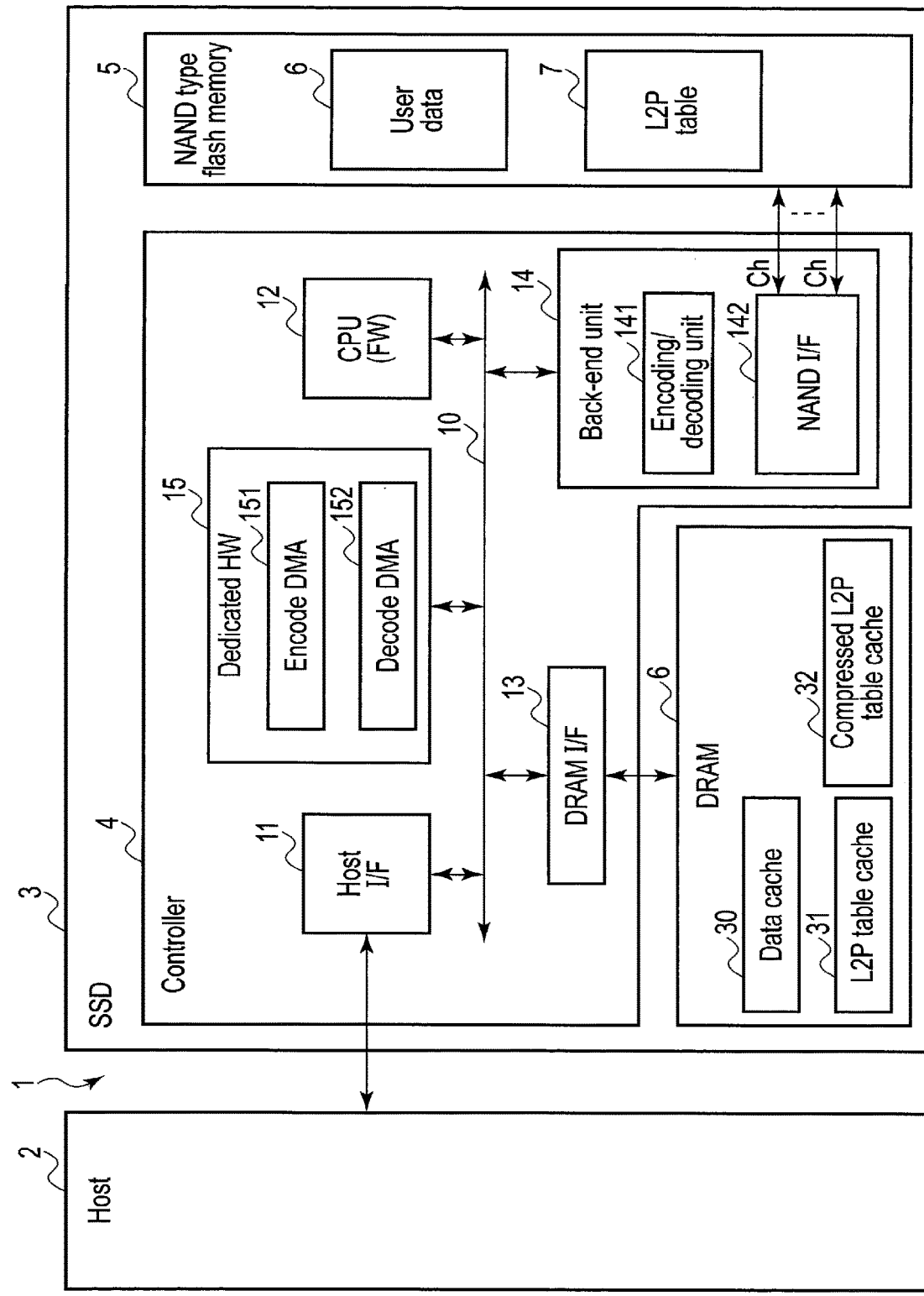
F I G. 1

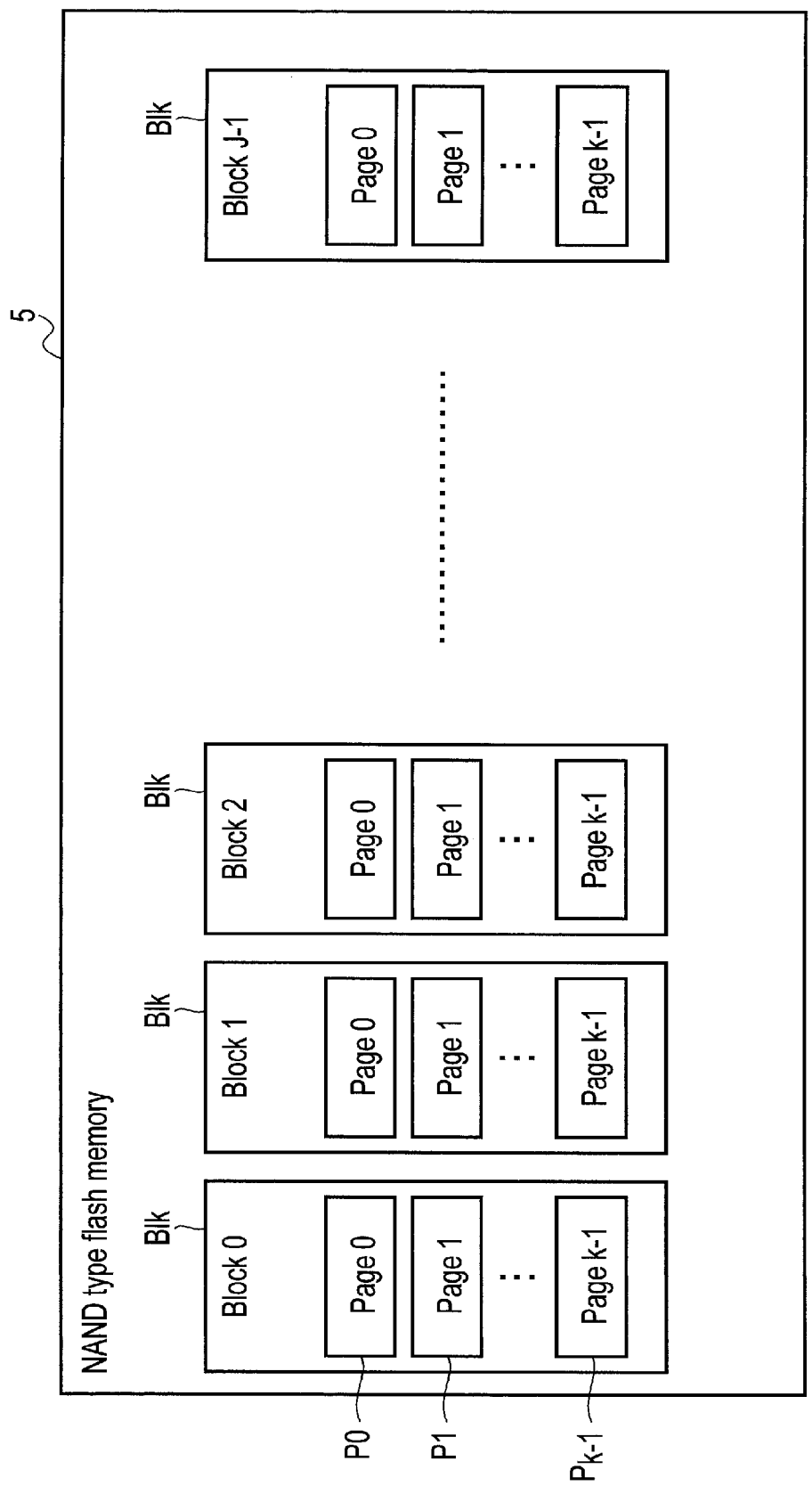
F I G. 2

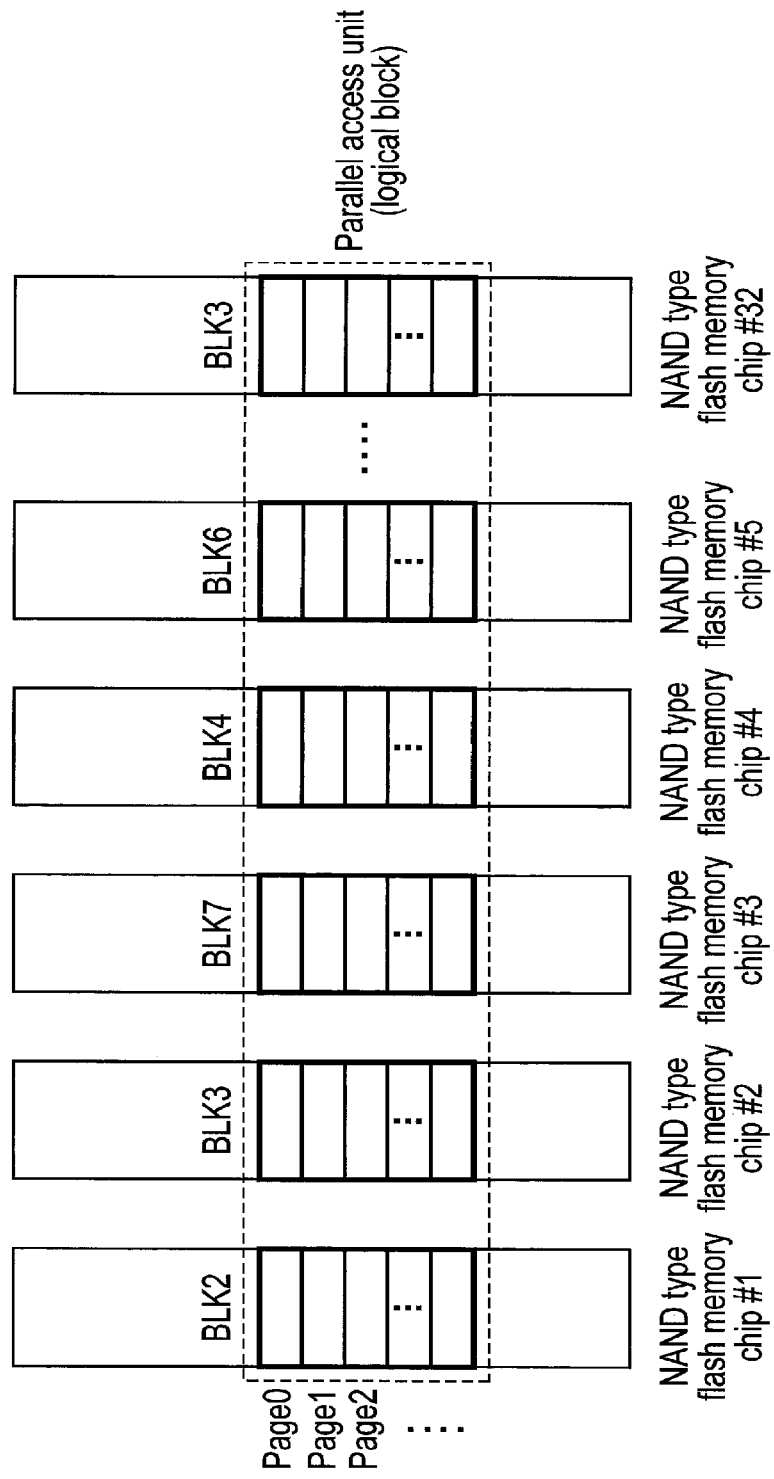
F I G. 4

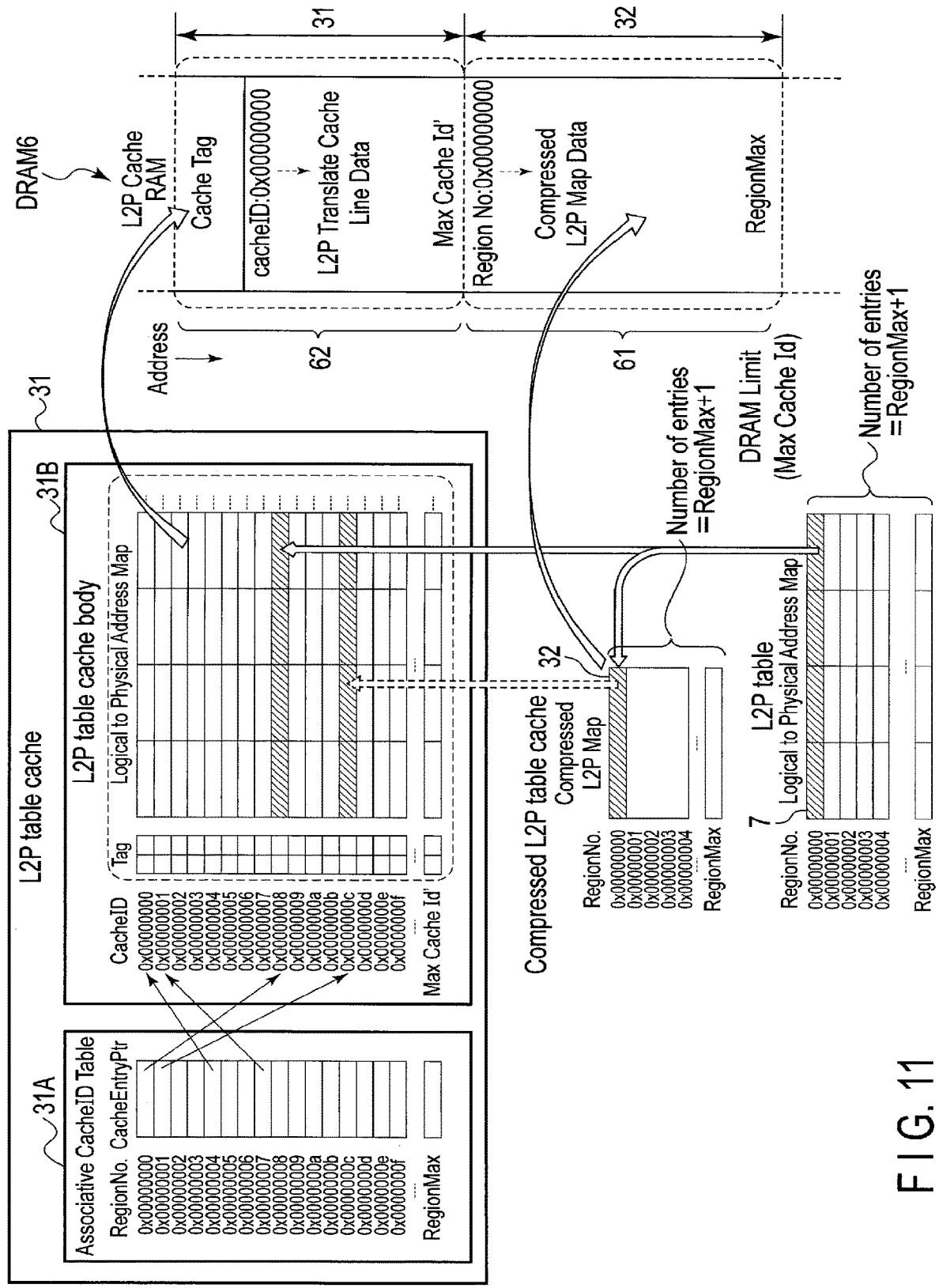
F I G. 11

MEMORY SYSTEM AND METHOD FOR CONTROLLING NONVOLATILE MEMORY

CROSS-REFERENCE TO RELATED APPLICATIONS

This application is based upon and claims the benefit of priority from Japanese Patent Application No. 2018-049897, filed Mar. 16, 2018, the entire contents of which are incorporated herein by reference.

FIELD

Embodiments described herein relate generally to technology for controlling a nonvolatile memory.

BACKGROUND

Recently, a memory system including a nonvolatile memory is widely used.

As the memory system, a solid-state drive (SSD) including a NAND type flash memory is known.

In the memory system, a logical-to-physical address translation for translating a logical address into a physical address of the nonvolatile memory is executed. If time required for the logical-to-physical address translation is lengthened, performance of the memory system may be degraded.

BRIEF DESCRIPTION OF THE DRAWINGS

FIG. 1 is a block diagram showing a configuration example of an information processing system including a memory system according to an embodiment;

FIG. 2 is a diagram showing a configuration example of a nonvolatile memory in the memory system according to the embodiment;

FIG. 4 is a diagram showing a configuration example of a parallel access unit (logical block) used in the memory system according to the embodiment;

FIG. 11 is a diagram showing a relation between an L2P table, the L2P table cache, and the compressed L2P table cache and an arrangement example of the L2P table cache and the compressed L2P table cache on a random access memory.

DETAILED DESCRIPTION

Figure 3:
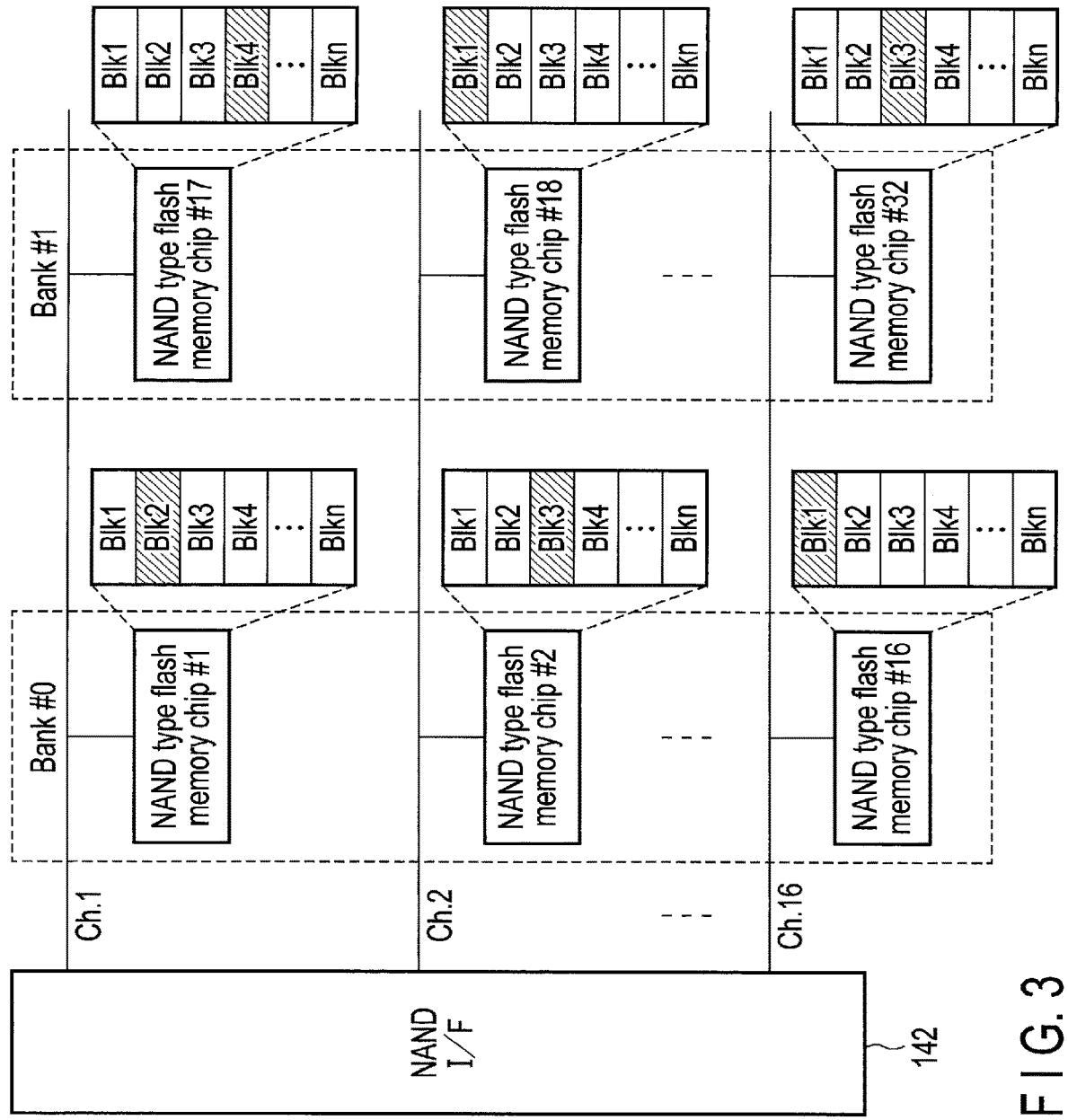
FIG. 3 is a block diagram showing a relation between a NAND interface and a plurality of NAND type flash memory chips in the memory system according to the embodiment.

Various embodiments will be described hereinafter with reference to the accompanying drawings.

In general, according to one embodiment, a memory system connectable to a host includes a nonvolatile memory and a controller. The controller is electrically connected to the nonvolatile memory. The controller is configured to store a part of contents of a logical-to-physical address translation table stored in the nonvolatile memory in a random access memory as a first cache, and store compressed address translation data obtained by compressing the contents of the logical-to-physical address translation table in the random access memory as a second cache.

When first address translation data including a first physical address indicating a physical storage location of the nonvolatile memory where data corresponding to a first logical address specified by the host is does not exist in the first cache and first compressed address translation data corresponding to the first address translation data exists in the second cache, the controller executes an operation for storing uncompressed address translation data into the first cache by decompressing the first compressed address translation data in the second cache, and an operation for acquiring the first physical address from the uncompressed address translation data.

When the first address translation data does not exist in the first cache and the first compressed address translation data does not exist in the second cache, the controller executes an operation for reading the first address translation data from the logical-to-physical address translation table, an operation for storing the read first address translation data in the first cache, an operation for acquiring the first physical address from the read first address translation data, and an operation for storing compressed address translation data obtained by compressing the read first address translation data into the second cache.

First, a configuration of an information processing system 1 including a memory system according to an embodiment will be described with reference to FIG. 1.

The memory system is a storage device configured to write data to a nonvolatile memory and to read data from the nonvolatile memory. For example, the memory system may be realized as a solid-state drive (SSD) or may be realized as a memory card. In the following description, it is assumed that the memory system is realized as a solid-state drive (SSD) 3.

The information processing system 1 includes a host (host device) 2 and the SSD 3. The host 2 may be a personal computer, a server, a mobile cellular phone, or an imaging device, may be a portable terminal such as a tablet and a smartphone, may be a game machine, or may be an onboard terminal such as a car navigation system.

The SSD 3 can be used as an external storage device of an information processing apparatus functioning as the host 2. The SSD 3 may be embedded in the information processing apparatus or may be connected to the information processing apparatus via a cable or a network.

As an interface for connecting the host 2 and the SSD 3 to each other, SCSI, Serial Attached SCSI (SAS), ATA, Serial ATA (SATA), PCI Express (PCIe) (registered trademark), Ethernet (registered trademark), Fibre channel, NVM Express (NVMe) (registered trademark), Universal Serial Bus (USB), Mobile Industry Processor Interface (MIPI), UniPro, and the like can be used.

The SSD 3 includes a controller 4 and a nonvolatile memory (NAND type flash memory) 5. Although not limited, the NAND type flash memory 5 may include a plurality of NAND type flash memory chips. The controller 4 is electrically connected to the NAND type flash memory 5 and operates as a memory controller configured to control the NAND type flash memory 5. The controller 4 may be realized by a circuit such as a system-on-a-chip (SoC).

The NAND type flash memory 5 is used for storing user data 6 and management information such as a logical-to-physical address translation table (L2P table) 7. Also, the logical-to-physical address translation table 7 is simply referred to as the L2P table 7 below. The L2P table 7 manages mapping between each of logical addresses specified by the host 2 and each of physical addresses of the NAND type flash memory 5. A logical address is an address used by the host 2 to specify an address of a location in a logical address space of the SSD 3. As the logical address, a logical block address (LBA) (addressing) can be used. A physical address indicates a physical storage location in the NAND type flash memory 5 where data is stored. The logical-to-physical address translation table 7, that is, the L2P table 7 is used to translate the logical address specified by the host 2 into the physical address indicating the physical storage location in the NAND type flash memory 5 where latest data corresponding to the logical address is stored.

The NAND type flash memory 5 has one or more NAND type flash memory chips each having a memory cell array. The memory cell array has a plurality of memory cells arranged in a matrix. As shown in FIG. 2, the memory cell array of the NAND type flash memory 5 includes a plurality of blocks (physical blocks) BLK0 to BLK (j–1). The blocks BLK0 to BLK (j–1) function as units of erase operations.

The blocks BLK0 to BLK (j–1) include a plurality of pages (physical pages). That is, each of the blocks BLK0 to BLK (j–1) includes pages P0, P1, . . . , and P (k–1). Each page includes a plurality of memory cells connected to the same word line. In the NAND type flash memory 5, read of data and write of data are executed in units of pages.

In FIG. 1, the controller 4 can function as a flash translation layer (FTL) configured to execute data management of the NAND type flash memory 5 and block management of the NAND type flash memory 5.

The data management includes (1) management of mapping information indicating a correspondence relation between each logical address and each physical address, (2) processing for concealing restriction of the NAND type flash memory 5 (for example, a read/write operation in a page unit and an erase operation in a block unit), and the like. Management of mapping between the logical address and the physical address is executed using the L2P table 7. The controller 4 uses the L2P table 7 to manage the mapping between each logical address and each physical address in a predetermined management size unit. Although not limited, a cluster may be used as an example of the management size. The cluster is a unit that specifies a location in the logical address space, and one of clusters includes a plurality of consecutive sectors (for example, 8 sectors, 16 sectors, or 32 sectors). In the following description, although not limited, it is assumed that one cluster includes 8 sectors. In this case, if a size of the sector is 512 bytes, a size of the cluster becomes 4 Kbytes (4 KB). The L2P table 7 may manage the mapping between each logical address and each physical address in units of clusters of 4 KB.

A physical address corresponding to a certain logical address indicates a latest physical storage location in the NAND type flash memory 5 where data corresponding to this logical address is written.

Data can be written to the page only once per erase cycle. Therefore, the controller 4 writes update data corresponding to a certain logical address to another physical storage location, not to the physical storage location where the previous data corresponding to the logical address is stored. In addition, the controller 4 updates the L2P table 7, associates the logical address with another physical storage location, and invalidates the previous data.

Block management includes management of defective blocks (bad blocks), wear leveling, garbage collection, and the like. The wear leveling is an operation for leveling wear of blocks.

The garbage collection is an operation for increasing the number of free blocks. The free blocks are blocks that do not include valid data. In the garbage collection, the controller 4 copies valid data in some blocks in which valid data and invalid data are mixed into other blocks (for example, free blocks). Here, the valid data means data associated with a certain logical address. For example, data referred to from the L2P table 7 (that is, data linked as the latest data from the logical address) is valid data and may be read from the host 2 later. The invalid data means data that is associated with no logical address. The data that is associated with no logical address is data that is no longer likely to be read from the host 2. In addition, the controller 4 updates the L2P table 7 and maps copy destination physical addresses to the logical addresses of the copied valid data. The valid data are copied into other blocks, so that the blocks including only the invalid data are released as the free blocks. As a result, the blocks can be reused for writing data after the erase operation for the blocks is executed.

The host 2 sends various commands to the SSD 3. These commands include a read command, a write command, an unmap command, and the like. The read command is a command for requesting the SSD 3 to read data. The read command includes a logical address (starting LBA) corresponding to data to be read and a length of the data to be read.

When the controller 4 receives the read command from the host 2, the controller 4 refers to the L2P table 7 to obtain a physical address corresponding to the starting LBA in the read command. The controller 4 reads data from the physical storage location of the NAND type flash memory 5 corresponding to the obtained physical address and returns the read data to the host 2.

The write command is a command for requesting the SSD 3 to write data. The write command includes a logical address (starting LBA) of write data (that is, data to be written) and a length of the write data. The controller 4 writes the write data to an available physical storage location in the NAND type flash memory 5. Furthermore, the controller 4 updates the L2P table 7 and maps the physical address corresponding to the physical storage location where the write data is written to the logical address corresponding to the write data.

The controller 4 uses a memory region in a random access memory such as a DRAM 6 as a L2P table cache 31 to cache a part of the contents of the L2P table 7. In other words, the controller 4 stores the part of the contents of the L2P table 7 in the random access memory such as the DRAM 6 as the L2P table cache 31. The controller 4 uses the L2P table cache 31 to execute the logical-to-physical address translation for translating the logical address specified by the host 2 into the physical address of the NAND type flash memory 5.

The random access memory such as the DRAM 6 can accessed faster than the NAND type flash memory 5. Therefore, the logical-to-physical address translation can be executed quickly by using the L2P table cache 31, so that performance of the logical-to-physical address translation can be improved and performance of the SSD 3 can be improved.

However, normally, the random access memory is relatively expensive and a random access memory having a capacity suitable for the size of the L2P table (typically, about 1/1000 of a capacity of the SSD 3) cannot be obtained.

In particular, with respect to a DRAM device (DRAM chip) provided by a DRAM vendor, it may be difficult to obtain a DRAM chip having a capacity suitable for the size of the L2P table. This is because the capacity of the DRAM chip tends to increase with a power of 2 like a 512 Mbit-DRAM, a 1024 Mbit-DRAM, and a 4096 Mbit-DRAM, while the capacity of the NAND type flash memory tends to increase with an integral multiple.

Therefore, when an SSD is designed, there may be the following two options.

(1) A plurality of DRAM chips are used or a DRAM chip having a higher capacity than the capacity suited for the size of the L2P table is used and the remainder of DRAM capacity is used for another purpose, so that a cost increase is allowed and priority is given to performance of the logical-to-physical address translation.

(2) Importance is placed on cost, the capacity of the DRAM to be mounted is not increased, and performance degradation of the logical-to-physical address translation due to an increase in the cache miss rate of the L2P table cache is allowed.

In the case of the SSD where importance is placed on cost, (2) is often applied. As a result, an increase in the cache miss rate of the L2P table cache may cause performance degradation of the logical-to-physical address translation and performance degradation of the SSD.

Therefore, in this embodiment, to efficiently use the memory region of the random access memory such as the DRAM 6, the controller 4 uses the memory region as two types of caches for the logical-to-physical address translation, that is, an L2P table cache 31 and a compressed L2P table cache 32. In other words, the controller 4 not only stores a part of the contents of the L2P table 7 in the random access memory such as the DRAM 6 as the L2P table cache 31, but also stores compressed address translation data obtained by compressing the contents of the L2P table 7 in the random access memory as the compressed L2P table cache 32.

The L2P table cache 31 is used to cache a part (uncompressed address translation data) of the contents of the L2P table 7. The L2P table cache 31 includes a plurality of cache entries (a plurality of cache lines) and each cache entry stores address translation data. The address translation data stored in one cache entry may include a plurality of physical addresses of the NAND type flash memory 5 corresponding to a plurality of consecutive logical addresses or may include one physical address of the NAND type flash memory 5 corresponding to one logical address. Hereinafter, it is assumed that the address translation data stored in one cache entry includes a plurality of physical addresses corresponding to a plurality of consecutive logical addresses, that is, the address translation data stored in the cache entry is an array including a plurality of elements (a plurality of physical addresses). In general, because the access to the NAND type flash memory 5 has spatial locality, a configuration of the L2P table cache 31 including a plurality of cache entries each storing a plurality of physical addresses corresponding to a plurality of consecutive logical addresses can increase the cache hit rate.

The compressed L2P table cache 32 is used to cache the compressed address translation data obtained by compressing the contents of the L2P table 7. The compressed L2P table cache 32 also includes a plurality of cache entries (a plurality of cache lines). The number of cache entries included in the compressed L2P table cache 32 may be larger than the number of cache entries included in the L2P table cache 31. The compressed address translation data stored in one cache entry of the compressed L2P table cache 32 may be compressed data obtained by compressing a plurality of physical addresses of the NAND type flash memory 5 corresponding to a plurality of consecutive logical addresses or may be compressed data obtained by compressing one physical address of the NAND type flash memory 5 corresponding to one logical address. Hereinafter, it is assumed that the compressed address translation data stored in one cache entry of the compressed L2P table cache 32 is compressed data obtained by compressing address translation data including a plurality of physical addresses corresponding to a plurality of consecutive logical addresses.

A size of the compressed address translation data for one cache entry of the compressed L2P table cache 32 is about a fraction of a size of the address translation data for one cache entry of the L2P table cache 31. Therefore, the compressed L2P table cache 32 can hold the compressed address translation data for logical-to-physical address translation for more logical addresses with a small memory capacity.

The controller 4 caches a part of the contents of the L2P table 7 in the L2P table cache 31 and caches the compressed address translation data obtained by compressing the contents of the L2P table 7 in the compressed L2P table cache 32.

When the controller 4 receives a read request (read command) from the host 2, the controller 4 executes the following logical-to-physical address translation processing.

First, the controller 4 determines whether address translation data including a physical address of the NAND type flash memory 5 corresponding to a logical address specified by the read request received from the host 2 exists in the L2P table cache 31 (cache hit check). If the address translation data does not exist in the L2P table cache 31 (cache miss), the controller 4 determines whether compressed address translation data corresponding to the address translation data exists in the compressed L2P table cache 32 (compressed cache hit check). If the compressed address translation data exists in the compressed L2P table cache 32 (compressed cache hit), the controller 4 uses the compressed address translation data of the compressed L2P table cache 32 to execute the logical-to-physical address translation.

In a configuration where the compressed L2P table cache 32 is not provided, if the cache miss of the L2P table cache 31 occurs, the controller 4 needs to read the address translation data corresponding to the specified logical address from the L2P table 7 in the NAND type flash memory 5. For this reason, it takes much time to perform the logical-to-physical address translation. In this embodiment, when the cache miss of the L2P table cache 31 occurs, compressed address translation data including a physical address indicating a physical storage location of the NAND type flash memory 5 where data corresponding to the specified logical address is stored can be acquired quickly from the compressed L2P table cache 32 on the DRAM 6.

When the cache miss of the L2P table cache 31 occurs and the compressed cache miss of the compressed L2P table cache 32 occur, the controller 4 reads the address translation data corresponding to the specified logical address from the L2P table 7 in the NAND type flash memory 5. In this case, the controller 4 stores the read address translation data in the L2P table cache 31 and stores compressed address translation data obtained by compressing the read address translation data in the compressed L2P table cache 32.

Next, a configuration of the controller 4 will be described. The controller 4 includes a host interface 11, a CPU 12, a DRAM interface 13, a back-end unit 14, a dedicated hardware (HW) 15, and the like. The host interface 11, the CPU 12, the DRAM interface 13, the back-end unit 14, and the dedicated hardware (HW) 15 are interconnected via the bus 10.

The host interface 11 functions as a circuit for receiving various commands such as a write command and a read command from the host 2.

The CPU 12 is a processor configured to control operations of the host interface 11, the DRAM interface 13, the back-end unit 14, the dedicated hardware (HW) 15, and the like. The CPU 12 performs various processing by executing a control program (firmware: FW) stored in a ROM not shown or the like. In addition to the FTL processing, the CPU 12 executes command processing for processing the various commands from the host 2. An operation of the CPU 12 is controlled by the firmware executed by the CPU 12. A part or all of the command processing described above may be executed by the dedicated hardware 15.

The DRAM interface 13 functions as a DRAM control circuit that controls the DRAM 6. The memory region of the DRAM 6 may function not only as the L2P table cache 31 and the compressed L2P table cache 32 but also as a data cache 30. The data cache 30 may be a read cache configured to cache data which is read from the NAND type flash memory 5 according to the read command received from the host 2. Alternatively, the data cache 30 may be a read/write cache configured to cache both data which is read from the NAND type flash memory 5 and write data which is received from the host 2. The data cache 30 may hold a logical address as a cache index for specifying the contents of each cache entry of the data cache 30. In this case, it is possible to easily determine the cache hit/miss of the data cache 30, based on a logical address specified by a read/write request received from the host 2. For example, if data corresponding to a logical address specified by the read request received from the host 2 exists in the data cache 30, the controller 4 can immediately read the data from the data cache 30, without performing the logical-to-physical address translation.

The back-end unit 14 includes an encoding/decoding unit 141 and a NAND interface 142. The encoding/decoding unit 141 can function as an error correction code (ECC) encoder and an ECC decoder, for example. When data should be written to the NAND type flash memory 5, the encoding/decoding unit 141 encodes write data to be written (ECC encoding), thereby adding an error correction code (ECC) as a redundant code to the write data. When data is read from the NAND type flash memory 5, the encoding/decoding unit 141 uses the ECC added to the read data to perform error correction of the read data (ECC decoding).

The NAND interface 142 functions as a NAND control circuit configured to control the NAND type flash memory 5. The NAND interface 142 may be connected to the NAND type flash memory 5 via a plurality of channels.

The dedicated hardware 15 may be hardware logic configured to perform direct memory access (DMA) transfer, compression, decompression, a variety of other operation processing, and the like. As a part of the hardware logic, the dedicated hardware 15 includes an encode-DMA controller 151 and a decode-DMA controller 152. The encode-DMA controller 151 is hardware for executing DMA transfer and compression and is used as an encoder circuit for compressing address translation data. The encode-DMA controller 151 may include a path for DMA-transferring data from a transfer source memory to a transfer destination memory and a circuit for compressing data passing through the path. The decode-DMA controller 152 is hardware for executing DMA transfer and decompression and functions as a decoder circuit for decompressing the compressed address translation data to generate uncompressed address translation data. The decode-DMA controller 152 may include a path for DMA-transferring data from the transfer source memory to the transfer destination memory and a circuit for decompressing data passing through the path.

FIG. 3 shows an example of a relation between the NAND interface 142 and a plurality of NAND type flash memory chips.

As shown in FIG. 3, the NAND type flash memory 5 may include a plurality of NAND type flash memory chips. In FIG. 3, the case where 16 channels Ch.1 to Ch.16 are connected to the NAND interface 142 and two NAND type flash memory chips are connected to each of the 16 channels Ch.1 to Ch.16 is exemplified. In this case, 16 NAND type flash memory chips #1 to #16 connected to the channels Ch.1 to Ch.16 may be organized as a bank #0 and the remaining 16 NAND type flash memory chips #17 to #32 connected to the channels Ch.1 to Ch.16 may be organized as a bank #1. The bank functions as a unit for causing a plurality of memory modules to execute a parallel operation by bank interleaving. In the configuration example of FIG. 3, a maximum of 32 NAND type flash memory chips can be operated in parallel by the 16 channels and the bank interleaving using the two banks.

To improve parallelism of the read/write operation with respect to the NAND type flash memory 5, the controller 4 may manage a plurality of parallel access units. Each parallel access unit includes a plurality of blocks selected one by one from a plurality of NAND type flash memory chips connected to different channels. A parallel access unit may be referred to as a logical block (or a super block). Although not limited thereto, a parallel access unit may include 32 blocks selected one by one from the NAND type flash memory chips #1 to #32. In FIG. 3, each block shown by hatching represents a block included in a certain parallel access unit. Each NAND type flash memory chip can be identified by a channel number and a bank number. In addition, each block can be identified by a chip number and a block number (block address) in a chip.

Each of the NAND type flash memory chips #1 to #32 may have a multi-plane configuration. For example, in the case where each of the NAND type flash memory chips #1 to #32 has a multi-plane configuration including two planes, a parallel access unit may include 64 blocks selected one by one from 64 planes corresponding to the NAND type flash memory chips #1 to #32.

Here, as shown in FIG. 4, it is assumed that a certain parallel access unit includes 32 physical blocks (a physical block Blk2 in the NAND type flash memory chip #1, a physical block Blk3 in the NAND type flash memory chip #2, a physical block Blk7 in the NAND type flash memory chip #3, a physical block Blk4 in the NAND type flash memory chip #4, a physical block Blk6 in the NAND type flash memory chip #5, . . . , and a physical block Blk3 in the NAND type flash memory chip #32).

In an operation for writing data in the parallel access unit, for example, the controller 4 may write data in order of a page 0 of the block Blk2 in the NAND type flash memory chip #1, a page 0 of the block Blk3 in the NAND type flash memory chip #2, a page 0 of the block Blk7 in the NAND type flash memory chip #3, a page 0 of the block Blk4 in the NAND type flash memory chip #4, a page 0 of the block Blk6 in the NAND type flash memory chip #5, . . . , and a page 0 of the block Blk3 in the NAND type flash memory chip #32. As a result, data write to a maximum of 32 pages can be performed in parallel. Even in an operation for reading data from the parallel access unit, data read from a maximum of 32 pages can be performed in parallel.

A configuration of the parallel access unit and the access order are not limited to the above examples and a variety of other parallel access unit configurations and access orders can be used.

Next, the logical-to-physical address translation processing executed by the controller 4 will be described.

To facilitate understanding, the logical-to-physical address translation processing applied to a configuration where the compressed L2P table cache does not exist will be first described with reference to FIG. 5.

A data access request (Data Access Request From Host) received from the host 2 specifies a logical address. Here, it is assumed that the data access request is a read request (read command).

When the controller 4 receives the read request (read command) from the host 2 (step S11), the controller 4 determines whether data corresponding to a logical address specified by the read request exists in the data cache (Logical Address Data Cache) 30 (Logical Address Data Cache Check) (step S12).

If the data corresponding to the logical address specified by the read request exists in the data cache 30 (hit), the controller 4 reads the data corresponding to the specified logical address from the data cache 30 (Access Logical Address Data Cache) (step S13) and returns the read data to the host 2 (Data Response To Host) (step S14).

If the data corresponding to the logical address specified by the read request does not exist in the data cache 30 (miss), the controller 4 uses the L2P table cache 31 or the L2P table 7 to perform the logical-to-physical address translation processing (Logical to Physical Address Translations) (step S15). The controller 4 uses a physical address obtained by the logical-to-physical address translation processing to read data (Device Data) from the NAND type flash memory 5 (Device Access by Physical Address) (Step S16). In addition, the controller 4 stores the read data in the data cache 30 (Update Logical Address Data Cache) (step S13) and returns the read data to the host 2 (Data Response To Host) (step S14).

An example of the procedure of the logical-to-physical address translation processing executed in step S15 is as follows.

The controller 4 translates the logical address specified by the read request received from the host 2 in a form of a cluster index (Cluster Idx) and an offset. The cluster index (Cluster Idx) indicates an identifier (cluster number) to specify a specific cluster in a plurality of clusters that specify a plurality of locations in the logical address space, respectively. The offset indicates a location of a sector to be accessed in the cluster. For example, when a cluster is configured to include 8 sectors, lower 3 bits ([2:0]) of a logical address ([31:0]) are used as the offset and upper 29 bits ([31:3]) of the logical address ([31:0]) are used as the cluster index for specifying a specific cluster to be accessed.

Furthermore, the controller 4 translates the cluster index ([31:3]) in a form of a region index (Region Idx) and a region offset, such that the number of physical addresses included in each cache entry (that is, each cache line) of the L2P table cache becomes the number convenient for access to the NAND type flash memory 5.

The region index indicates a logical address range (a region) in a plurality of logical address ranges (a plurality of regions) obtained by dividing a logical address space represented by the logical address ([31:0]). The region offset indicates a size of each region (each logical address range), that is, the number of clusters included in each region.

A region (a region index) is assigned to each cache entry of the L2P table cache 31 and a size of each cache entry is set to a size to store the same number of physical addresses as the number of clusters included in each region.

A size of each region (each logical address range) may be determined in consideration of the configuration of the above-described parallel access unit and the like. The size of each region is not limited thereto and the size may be determined as, for example, a size including 128 clusters.

In this case, the size of each cache entry in the L2P table cache is set to a size to store 128 physical addresses corresponding to 128 clusters of which logical addresses are consecutive. Each cache entry stores 128 physical addresses. For this reason, if a physical address corresponding to a cluster has a size of 4 bytes, the size of each cache entry becomes 512 bytes (=4 bytes×128).

128 logical addresses belonging to each region are mapped to 128 physical storage locations of the NAND type flash memory 5, respectively, and 128 clusters (128 data units each has 4 KB) corresponding to the 128 logical addresses are written to the 128 physical storage locations of the NAND type flash memory 5, respectively. For example, these 128 physical storage locations may be distributed to several NAND type flash memory chips connected to different channels, that is, a plurality of blocks forming the parallel access unit. In addition, 128 physical addresses indicating the 128 physical storage locations are mapped to these 128 logical addresses, respectively.

When each region includes 128 clusters, lower 7 bits ([9:3]) of the cluster index ([31:3]) are used as a region offset, and upper 22 bits ([31:10]) of the cluster index ([31:3]) are used as a region index.

The L2P table cache 31 includes N+1 cache entries (N+1 cache lines). Here, N+1 may be smaller than the total number of regions (=(M+1)). A tag field corresponding to each cache entry of the L2P table cache 31 indicates which region's address translation data (128 physical addresses)

are stored in the cache entry. For example, a tag field of "0" associated with a certain cache entry indicates that address translation data corresponding to a region having a region number=0 is stored in the cache entry and a tag field of "2" associated with a certain cache entry indicates that address translation data corresponding to a region having a region number=2 is stored in the cache entry.

Each cache entry of the L2P table cache 31 includes a field corresponding to a region offset=+0, a field corresponding to a region offset=+1, a field corresponding to a region offset=+2, a field corresponding to a region offset=+3, . . . , and a field corresponding to a region offset=+127.

Figure 5:
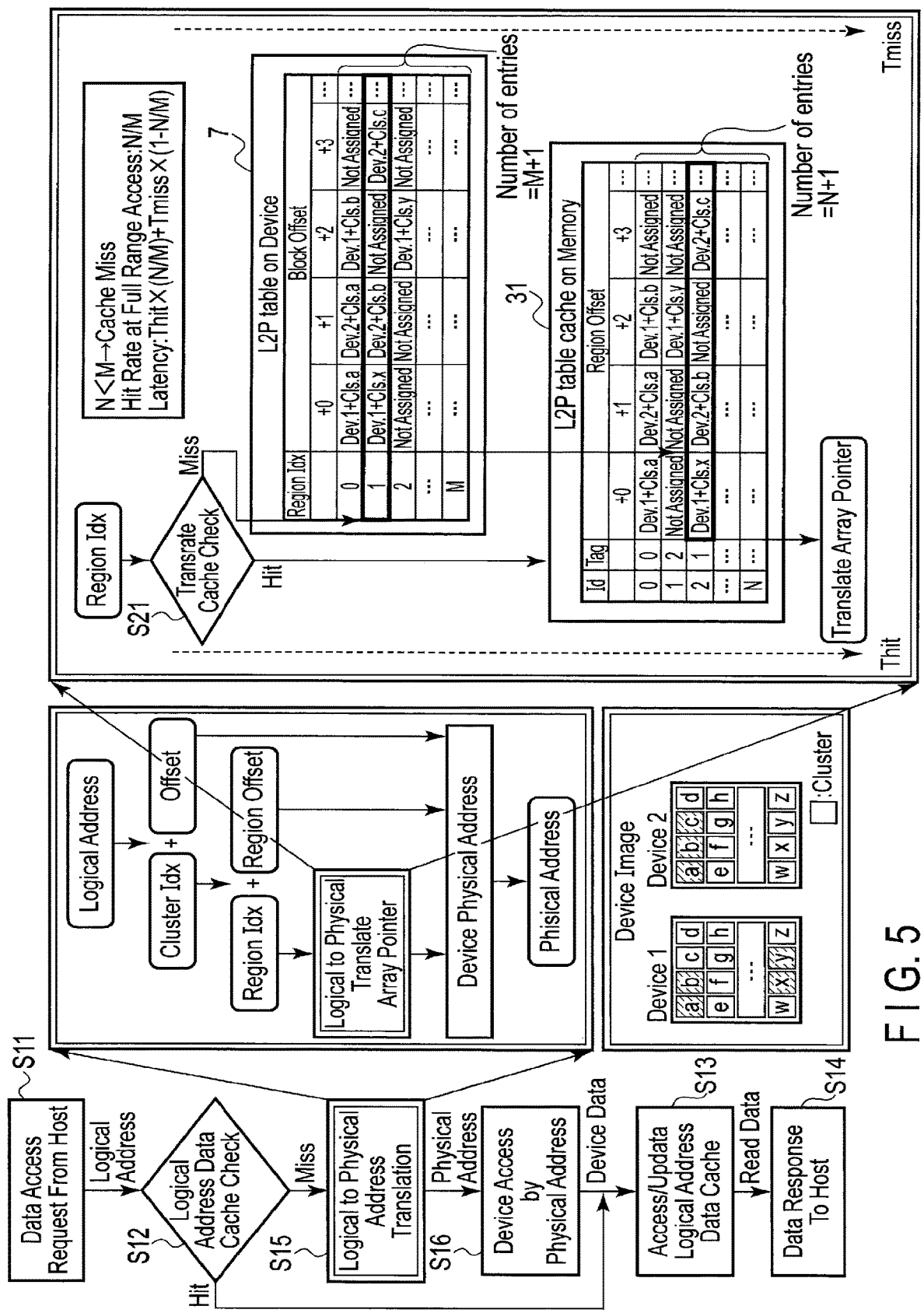
FIG. 5 is a diagram for explaining logical-to-physical address translation processing applied to a configuration in which there is no compressed logical-to-physical address translation table cache (no compressed L2P table cache)

For example, when data corresponding to a first logical address belonging to the region having the region number=0 is written to a physical storage location (cluster a) of a device (NAND type flash memory chip) #1 as shown as a device image in FIG. 5, the field corresponding to the region offset=+0 in the address translation data corresponding to the region includes a physical address indicating the physical storage location (cluster a) of the device (NAND type flash memory chip) #1. In addition, when data corresponding to a second logical address belonging to the region having the region number=0 is written to a physical storage location (cluster a) of a device (NAND type flash memory chip) #2 as shown as a device image in FIG. 5, the field corresponding to the region offset=+1 in the address translation data corresponding to the region includes a physical address indicating the physical storage location (cluster a) of the device (NAND type flash memory chip) #2. Similarly, when data corresponding to a third logical address belonging to the region having the region number=0 is written to a physical storage location (cluster b) of the device (NAND type flash memory chip) #1 as shown as a device image in FIG. 5, the field corresponding to the region offset=+2 in the address translation data corresponding to the region includes a physical address indicating the physical storage location (cluster b) of the device (NAND type flash memory chip) #1.

A field described as "Not Assigned" indicates that data of a logical address corresponding to the field is not yet written to the NAND type flash memory 5.

In the logical-to-physical address translation processing, the controller 4 refers to the tag field corresponding to each cache entry of the L2P table cache 31 and determines whether address translation data corresponding to the logical address specified by the host 2, that is, address translation data corresponding to the region index of the logical address exists in the L2P table cache 31 (Translate Cache Check) (step S21).

If the address translation data corresponding to the region index of the logical address exists in the L2P table cache 31 (hit), the controller 4 extracts a physical address corresponding to the logical address specified by the host 2 from the address translation data in the L2P table cache 31. The physical address indicates the physical storage location of the NAND type flash memory 5 in which the data of the logical address is stored.

More specifically, the controller 4 performs the following processing to acquire the physical address.

First, the controller 4 acquires a pointer (Logical to Physical Translate Array Pointer) indicating a cache entry in the L2P table cache 31 in which address translation data corresponding to the region index of the logical address exists. The pointer indicates a head address of the memory region of the DRAM 6 in which the cache entry is stored. The address translation data in the cache entry includes 128 offset elements (that is, 128 physical addresses corresponding to 128 clusters). Therefore, the controller 4 specifies an offset element (a physical address) corresponding to a region offset value from these 128 offset elements (128 physical addresses) specified by the pointer. In addition, the controller 4 adds an offset to the specified offset element (physical address), thereby obtaining a physical address of the NAND type flash memory 5 in which data of the logical address specified by the host 2 is stored.

In this embodiment, time required to acquire the physical address from the L2P table cache 31, that is, time required to acquire the pointer (Logical to Physical Translate Array Pointer) is referred to as Thit.

As shown in FIG. 5, the L2P table 7 includes the same number of entries (M+1 entries) as the total number of regions. A region index is associated with each entry of the L2P table 7. The address translation data stored in each entry of the L2P table 7 includes 128 physical addresses corresponding to 128 consecutive logical addresses, similar to the L2P table cache 31.

If the address translation data corresponding to the region index of the logical address specified by the host 2 does not exist in the L2P table cache 31 (Miss), the controller 4 reads the address translation data corresponding to the region index from the L2P table 7 on the NAND type flash memory 5.

In addition, the controller 4 stores the read address translation data in a cache entry of the L2P table cache 31 and acquires the physical address corresponding to the logical address specified by the host 2 from the read address translation data.

More specifically, the controller 4 first acquires the pointer (Logical to Physical Translate Array Pointer) indicating the cache entry of the L2P table cache 31 in which the read address translation data is stored. The controller 4 specifies an offset element (physical address) corresponding to the region offset value from these 128 offset elements (128 physical addresses) specified by the pointer. In addition, the controller 4 adds an offset to the specified offset element (physical address), thereby obtaining the physical address of the NAND type flash memory 5 in which the data corresponding to the logical address specified by the host 2 is stored.

If all replacement target cache entry candidates in the L2P table cache 31 are in use, that is, if an unused cache entry does not exist in these replacement target cache entry candidates, the controller 4 determines a replacement target cache entry from the replacement target cache entry candidates. In addition, the controller 4 evicts the replacement target cache entry from the L2P table cache 31 and stores the read address translation data in the replacement target cache entry. When the L2P table cache 31 is realized by a full associative cache, all the cache entries become the replacement target cache entry candidates.

Normally, read latency for the NAND type flash memory is longer than read latency of the random access memory such as the DRAM. For this reason, time Tmiss required to acquire the physical address from the address translation data in the L2P table 7 becomes longer than Thit described above.

As described above, the number of cache entries (=N+1) in the L2P table cache 31 is smaller than the number of entries (=M+1) in the L2P table 7. Therefore, the cache hit rate (N/M) of the L2P table cache 31 is smaller than 1 and average access latency (Latency: Thit×(N/M)+Tmiss×(1−N/M)) may become a relatively large value.

Figure 6:
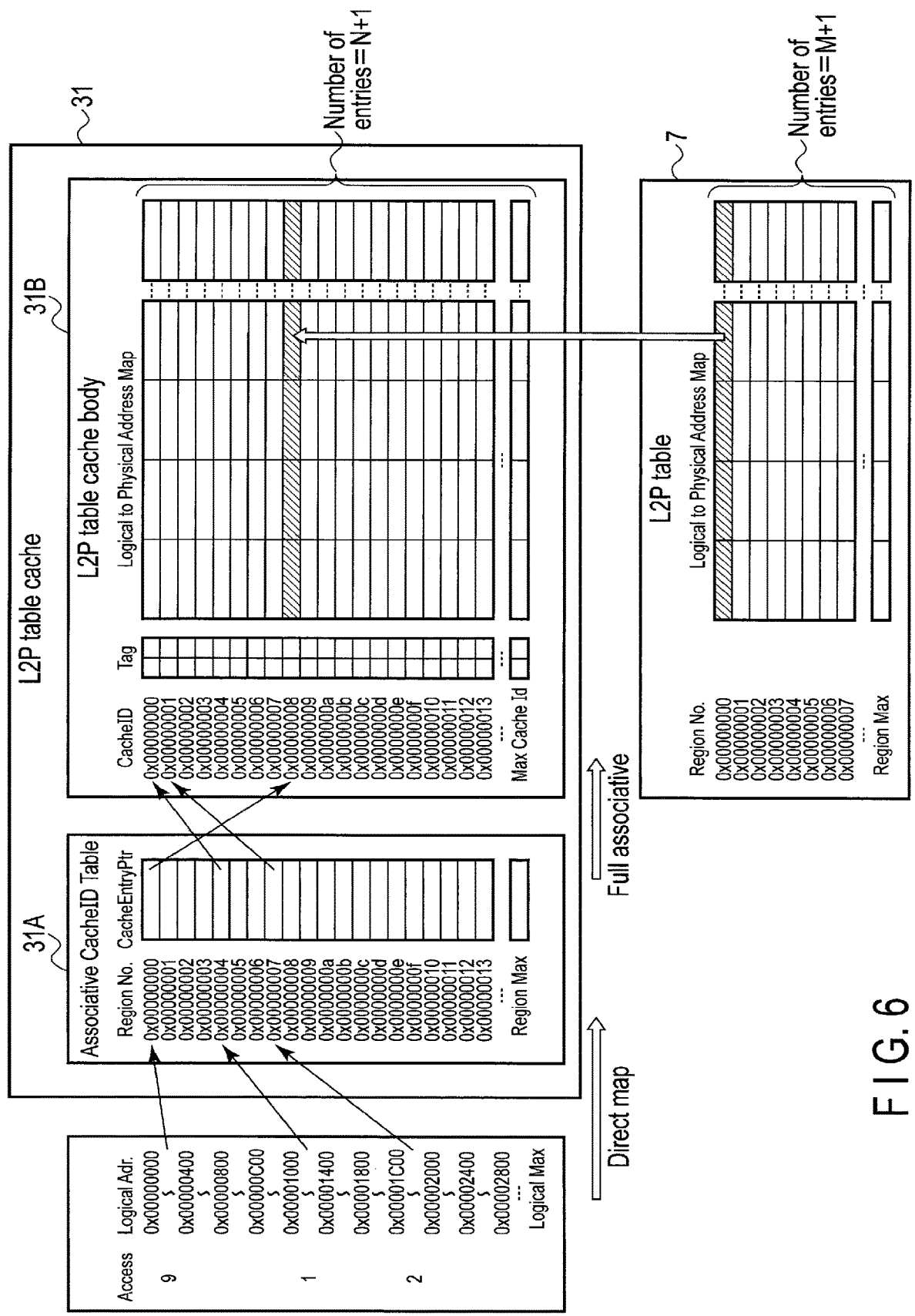
FIG. 6 is a diagram showing a configuration example of a logical-to-physical address translation table cache (L2P table cache)

FIG. 6 shows a configuration example of the L2P table cache 31.

The L2P table cache 31 may include a first level table (Associative CacheID Table) 31A and an L2P table cache body 31B functioning as a second level table.

The first level table (Associative CacheID Table) 31A includes N+1 pointers (Cache Entry Ptr). The first level table 31A may be realized as, for example, a direct map cache. In this case, a region number 0 (=0x00000000) corresponding to a logical address range from 0x00000000 to 0x000003ff is mapped to a first pointer in the N+1 pointers. A region number 1 (=0x00000001) corresponding to a logical address range from 0x00000400 to 0x000007ff is mapped to a second pointer in the N+1 pointers. Similarly, a region number 4 (=0x00000004) corresponding to a logical address range from 0x00001000 to 0x000013ff is mapped to a fifth pointer in the N+1 pointers.

The L2P table cache body 31B includes N+1 cache entries. A tag field is associated with each cache entry. Each of the N+1 cache entries is identified by a cache ID (CacheID). The L2P table cache body 31B may be realized as, for example, a full associative cache.

Immediately after the SSD 3 is powered on, all cache entries in the L2P table cache 31 are empty. Therefore, the cache miss of the L2P table cache 31 occurs and the address translation data read from the L2P table 7 is stored in one of the cache entries of the L2P table cache 31.

Here, it is assumed that, after the SSD 3 is powered on, the controller 4 receives the read request from the host 2 in order of a read request (first read request) specifying a logical address belonging to the logical address range from 0x00001000 to 0x000013ff, a read request (second read request) specifying a logical address belonging to the logical address range from 0x00001c00 to 0x00001fff, . . . , and a read request (ninth read request) specifying a logical address belonging to the logical address range from 0x00000000 to 0x000003ff.

Processing for the first read request: the cache miss of the L2P table cache 31 occurs and the controller 4 reads the address translation data of the region number 4 corresponding to the logical address range from 0x00001000 to 0x000013ff from the L2P table 7 and stores the read address translation data in the first cache entry (that is, the cache entry corresponding to CacheID=0x00000000) of the L2P table cache 31. In the first level table (Associative CacheID Table) 31A, the pointer (Cache Entry Ptr) of the region number 4 is updated by the controller 4 such that the pointer (Cache Entry Ptr) of the region number 4 points to CacheID=0x00000000.

Processing for the second read request: the cache miss of the L2P table cache 31 occurs and the controller 4 reads the address translation data of the region number 7 corresponding to the logical address range from 0x00001c00 to 0x00001fff from the L2P table 7 and stores the read address translation data in the second cache entry (that is, the cache entry corresponding to CacheID=0x00000001) of the L2P table cache 31. In the first level table (Associative CacheID Table) 31A, the pointer (Cache Entry Ptr) of the region number 7 is updated by the controller 4 such that the pointer (Cache Entry Ptr) of the region number 7 points to CacheID=0x00000001.

Processing for the ninth read request: the cache miss of the L2P table cache 31 occurs and the controller 4 reads the address translation data of the region number 0 corresponding to the logical address range from 0x00000000 to 0x000003ff from the L2P table 7 and stores the read address translation data in the ninth cache entry (that is, the cache entry corresponding to CacheID=0x00000008) of the L2P table cache 31. In the first level table (Associative CacheID Table) 31A, the pointer (Cache Entry Ptr) of the region number 0 is updated by the controller 4 such that the pointer (Cache Entry Ptr) of the region number 0 points to CacheID=0x00000008.

Figure 7:
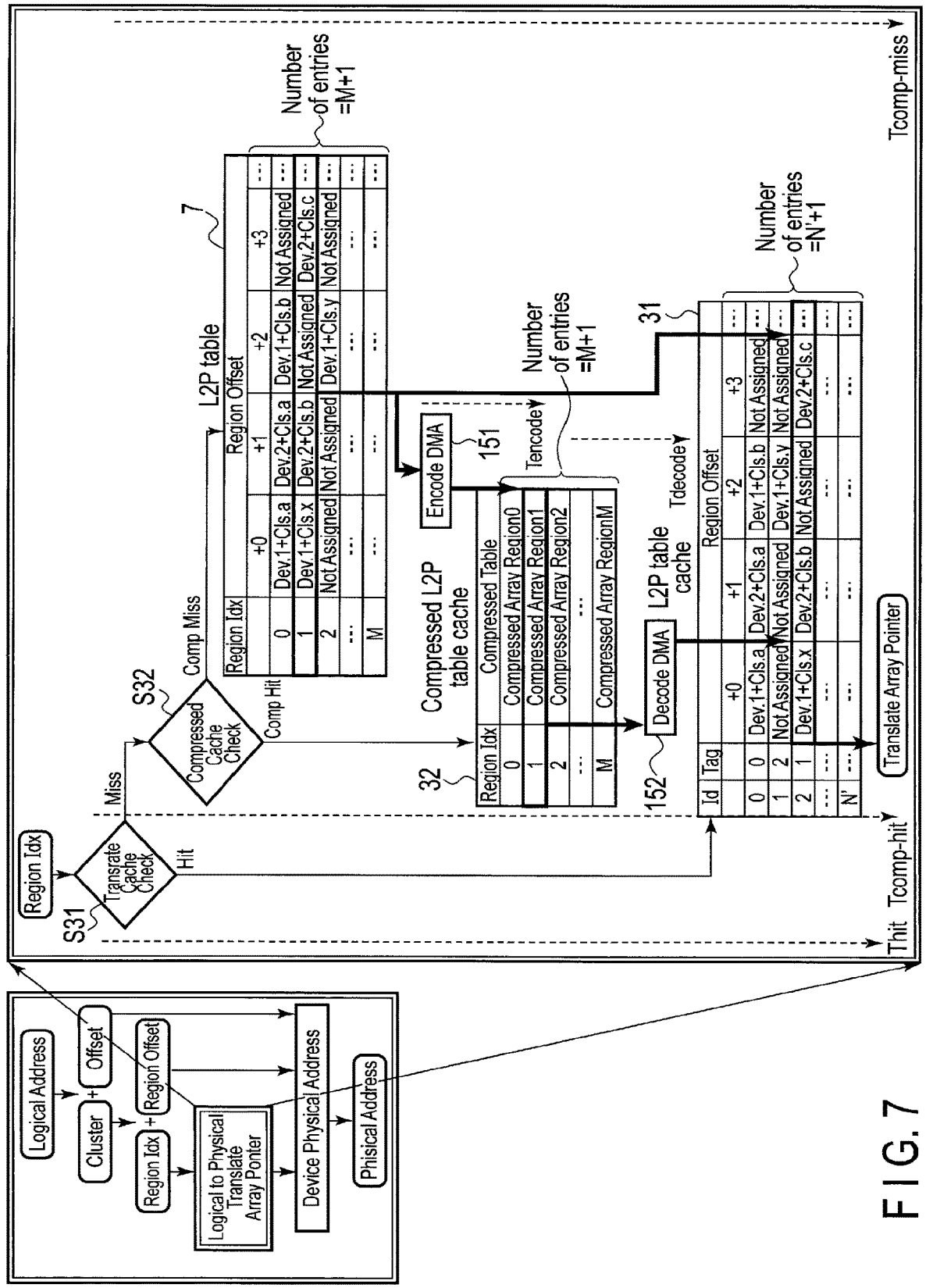
FIG. 7 is a diagram for explaining the logical-to-physical address translation processing executed using the L2P table cache and the compressed L2P table cache.

FIG. 7 shows the logical-to-physical address translation processing using the L2P table cache 31 and the compressed L2P table cache 32.

In this embodiment, the cache hit check of the L2P table cache 31 is executed in the same procedure as the procedure described in FIG. 6. When the cache miss of the L2P table cache 31 occurs, a compressed cache hit check of the compressed L2P table cache 32 is executed to enable the pointer (Logical to Physical Translate Array Pointer) to be acquired at high speed.

In the logical-to-physical address translation processing, the controller 4 refers to the tag field corresponding to each cache entry of the L2P table cache 31 and determines whether the address translation data corresponding to the logical address specified by the host 2, that is, the address translation data corresponding to the region index of the logical address exists in the L2P table cache 31 (Translate Cache Check) (step S31).

If the address translation data corresponding to the region index of the logical address exists in the L2P table cache 31 (hit), the controller 4 extracts a physical address corresponding to the logical address specified by the host 2 from the address translation data in the L2P table cache 31.

More specifically, the controller 4 first acquires the pointer (Logical to Physical Translate Array Pointer) indicating the cache entry in the L2P table cache 31 in which the address translation data corresponding to the region index of the logical address exists. The controller 4 specifies an offset element (physical address) corresponding to the region offset value from these 128 offset elements (128 physical addresses) specified by the pointer. In addition, the controller 4 adds an offset to the specified offset element (physical address), thereby obtaining a physical address of the NAND type flash memory 5 in which data of the logical address specified by the host 2 is stored.

If the address translation data corresponding to the region index of the logical address specified by the host 2 does not exist in the L2P table cache 31 (Miss), the controller 4 determines whether the compressed address translation data corresponding to the address translation data, that is, the compressed address translation data corresponding to the region index exists in the compressed L2P table cache 32 (Compressed cache hit check) (step S32).

As shown in FIG. 7, the compressed L2P table cache 32 may include the same number of cache entries (M+1 cache entries) as the number of entries in the L2P table 7. Each cache entry of the compressed L2P table cache 32 stores compressed address translation data (Compressed Array Region) obtained by compressing the address translation data including the 128 physical addresses corresponding to the 128 clusters.

If the compressed address translation data corresponding to the region index of the logical address specified by the host 2 exists in the compressed L2P table cache 32 (Comphit), the controller 4 executes an operation for storing uncompressed address translation data obtained by decompressing the compressed address translation data in the compressed L2P table cache 32 in the cache entry of the L2P table cache 31 and an operation for acquiring the physical address corresponding to the logical address specified by the host 2 from the uncompressed address translation data.

A decompression transfer operation including a decode operation for decompressing the compressed address translation data and an operation for transferring the uncompressed address translation data obtained by the decode operation to the cache entry of the L2P table cache 31 can be executed by the decode-DMA controller 152.

If all replacement target cache entry candidates in the L2P table cache 31 are in use, that is, if an unused cache entry does not exist in these replacement target cache entry candidates, the controller 4 determines a replacement target cache entry from the replacement target cache entry candidates. In addition, the controller 4 evicts the replacement target cache entry from the L2P table cache 31 and stores the uncompressed address translation data in the replacement target cache entry.

In the operation for acquiring the physical address corresponding to the logical address specified by the host 2 from the uncompressed address translation data, the controller 4 first acquires the pointer (Logical to Physical Translate Array Pointer) indicating the cache entry of the L2P table cache 31 in which the uncompressed address translation data is stored. The controller 4 specifies an offset element (physical address) corresponding to the region offset value from these 128 offset elements (128 physical addresses) specified by the pointer. In addition, the controller 4 adds an offset to the specified offset element (physical address), thereby obtaining a physical address of the NAND type flash memory 5 in which data of the logical address specified by the host 2 is stored.

Time required to acquire the physical address from the compressed address translation data of the compressed L2P table cache 32, that is, time required to acquire the pointer (Logical to Physical Translate Array Pointer) using the compressed L2P table cache 32 is Tcomp_hit. Tcomp_hit is increased by latency (Tdecode) required for decompression transfer of the compressed address translation data of the compressed L2P table cache 32 than Thit. However, a ratio between Tcomp_hit and Thit is in a range of at most a digit and Tcomp_hit is much shorter than Tmiss.

On the other hand, if the compressed address translation data corresponding to the region index of the logical address specified by the host 2 does not exist in the compressed L2P table cache 32 (CompMiss), the controller 4 reads the address translation data corresponding to the region index from the L2P table 7 on the NAND type flash memory 5.

In addition, the controller 4 executes an operation for storing the read address translation data in the L2P table cache 31, an operation for acquiring the physical address corresponding to the logical address specified by the host 2 from the read address translation data, and an operation for storing the compressed address translation data obtained by compressing the read address translation data in the compressed L2P table cache 32.

Compression transfer including an encode operation for compressing the read address translation data and an operation for storing the compressed address translation data obtained by the encode operation in the compressed L2P table cache 32 can be executed by the encode-DMA controller 151.

In the operation for acquiring the physical address corresponding to the logical address specified by the host 2 from the read address translation data, the controller 4 first acquires the pointer (Logical to Physical Translate Array Pointer) indicating the cache entry of the L2P table cache 31 in which the read address translation data is stored. The controller 4 specifies an offset element (physical address) corresponding to the region offset value from these 128 offset elements (128 physical addresses) specified by the pointer. In addition, the controller 4 adds an offset to the specified offset element (physical address), thereby obtaining a physical address of the NAND type flash memory 5 in which data of the logical address specified by the host 2 is stored.

If all replacement target cache entry candidates in the L2P table cache 31 are in use, that is, if an unused cache entry does not exist in these replacement target cache entry candidates, the controller 4 determines a replacement target cache entry from the replacement target cache entry candidates. In addition, the controller 4 evicts the replacement target cache entry from the L2P table cache 31 and stores the read address translation data in the replacement target cache entry.

Time Tcomp_miss required to acquire the physical address from the address translation data in the L2P table 7 when CompMiss occurs becomes a value obtained by adding time required for hit/miss determination (compressed cache check) of the compressed L2P table cache 32 to Tmiss. Since time required for the compressed cache check is small, Tcomp_miss hardly increases as compared with Tmiss.

In addition, time Tencode required for the compression transfer is almost the same as Tdecode and is sufficiently smaller than Tcomp_miss.

When the compressed L2P table cache 32 has a size capable of holding the compressed address translation data for the logical-to-physical address translation for all the logical addresses of the SSD 3, that is, when the compressed L2P table cache 32 has M+1 cache entries, after the compressed address translation data is transferred to all the M+1 cache entries, a hit rate of the compressed L2P table cache 32 becomes approximately 1 unless the contents of the L2P table 7 are updated by writing update data. Therefore, an influence of Tcomp_miss is practically negligible and Tcomp_latency to be average latency (average time) required for the logical-to-physical address translation in this embodiment is determined by a ratio between Thit and Tcomp_hit.

In summary, in the logical-to-physical address translation processing of FIG. 5 not using the compressed L2P table cache 32, Tlatency to be average latency (average time) required for the logical-to-physical address translation becomes Tlatency=Thit×(N/M)+Tmiss×(1−N/M).

Tcomp_latency in the case where the compressed L2P table cache 32 has M+1 cache entries becomes Tcomp_latency=Thit×(N'/M)+Tcomp_hit×(1−N'/M).

Here, N' indicates the number of cache entries in the L2P table cache 31 in the case where the compressed L2P table cache 32 having M+1 cache entries is secured in the memory region for the logical-to-physical address translation on the DRAM 6 and the remaining region of the memory region is used as the L2P table cache 31.

When Thit=250 ns, Tmiss=4 µs, and Tcomp_hit=1 µs are set, Tlatency in the case where a hit rate of the L2P table cache 31 is 40% is 2.5 µs. On the other hand, for Tcomp_latency, even if it is assumed that the L2P table cache 31 does not exist (that is, even if (N'/M)=0 is set and only the compressed L2P table cache 32 is secured on the DRAM 6), Tcomp_latency becomes 1 µs and a result of Tcomp_latency<Tlatency can be obtained.

Figure 8:
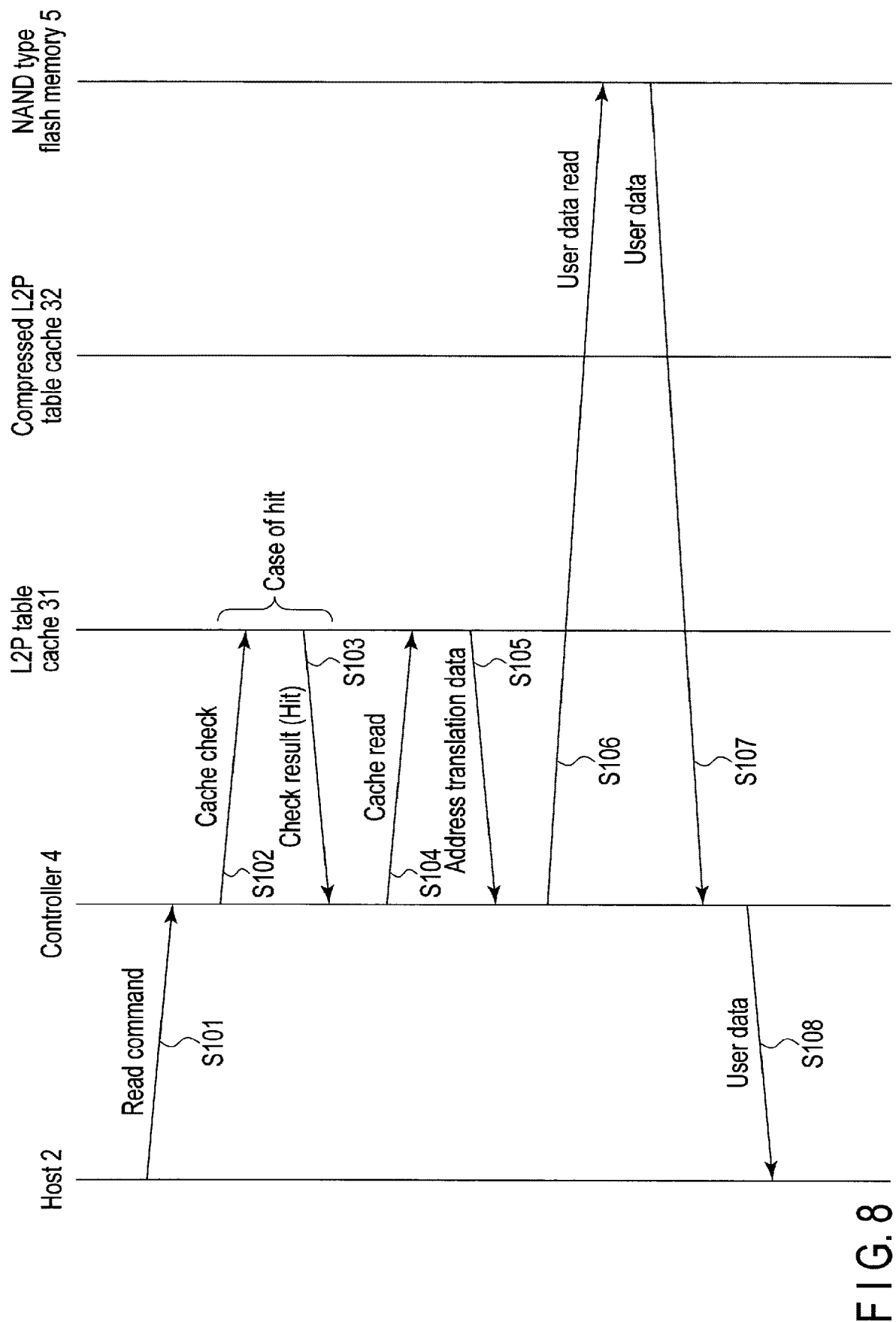
FIG. 8 is a diagram showing a processing sequence of cache control processing executed by the memory system according to the embodiment when a cache hit of the L2P table cache occurs.

FIG. 8 shows a processing sequence of cache control processing executed when the cache hit of the L2P table cache 31 occurs.

The host 2 sends a read command to the SSD 3 (step S101). When the controller 4 receives the read command from the host 2, the controller 4 executes the cache hit check of the L2P table cache 31 (step S102) and the controller 4 determines whether the L2P table cache 31 is in a state of the cache hit or a state of the cache miss, based on a result of the cache hit check (step S103).

The cache hit means a state in which address translation data including the physical address corresponding to the logical address specified by the read command exists in the L2P table cache 31. The cache miss means a state in which the address translation data including the physical address corresponding to the logical address specified by the read command does not exist in the L2P table cache 31.

In the case of the cache hit, the controller 4 read-accesses the L2P table cache 31 and reads the address translation data from the L2P table cache 31 (steps S104 and S105). In addition, the controller 4 acquires the physical address corresponding to the logical address in the read command from the address translation data. The controller 4 can read only the physical address in the address translation data from the L2P table cache 31.

In addition, the controller 4 read-accesses the NAND type flash memory 5 using the physical address and reads user data specified by the logical address in the read command from the NAND type flash memory 5 (steps S106 and S107). The controller 4 returns the user data to the host 2 (step S108).

Figure 9:
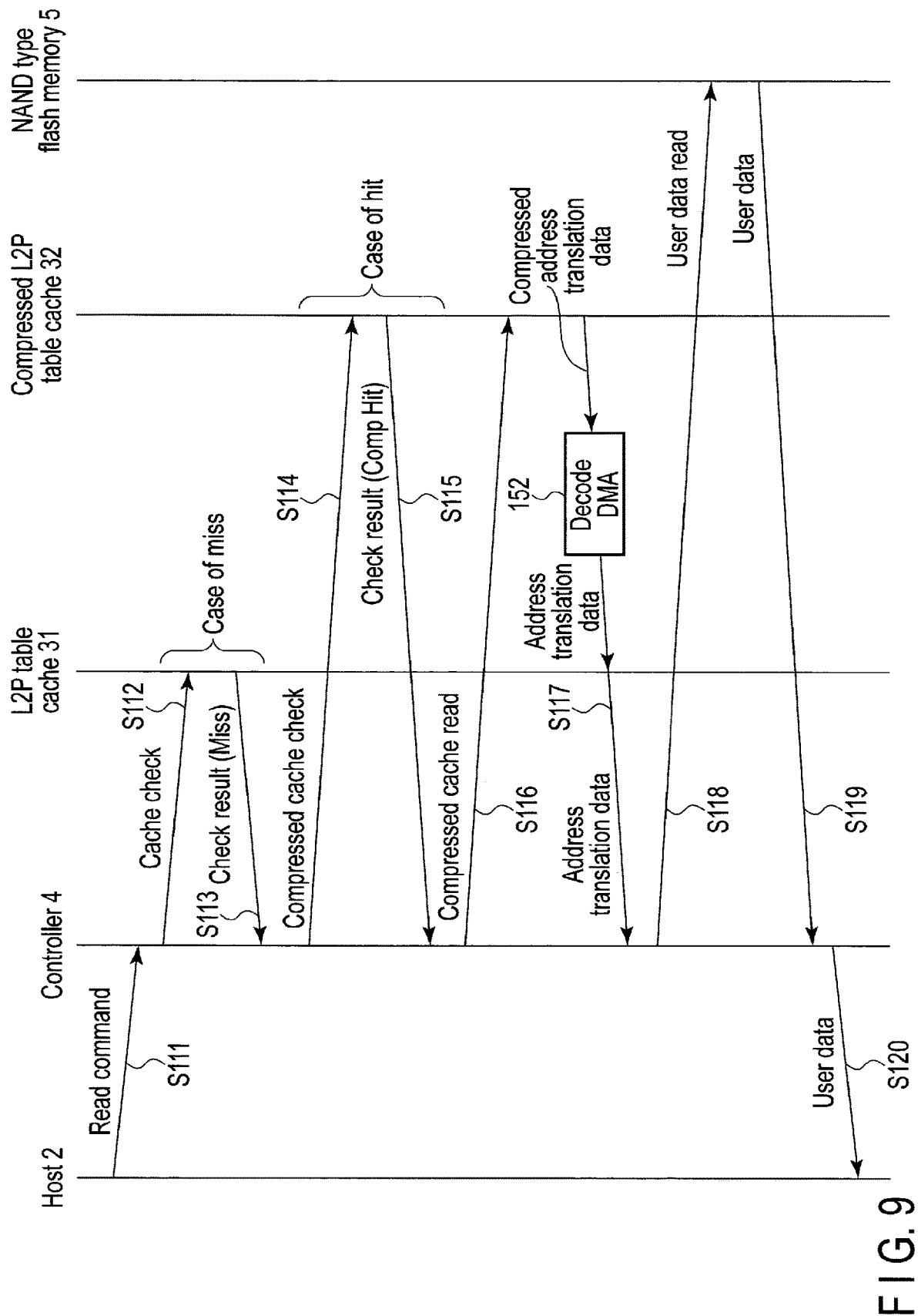
FIG. 9 is a diagram showing a processing sequence of cache control processing executed by the memory system according to the embodiment when a cache miss of the L2P table cache occurs and a cache hit of the compressed L2P table cache occurs.

FIG. 9 shows a processing sequence of cache control processing executed when the cache miss of the L2P table cache 31 occurs and the cache hit of the compressed L2P table cache 32 occurs.

The host 2 sends the read command to the SSD 3 (step S111). When the controller 4 receives the read command from the host 2, the controller 4 executes the cache hit check of the L2P table cache 31 (step S112) and the controller 4 determines whether the L2P table cache 31 is in a state of the cache hit or a state of the cache miss, based on a result of the cache hit check (step S113).

In the case of the cache miss, the controller 4 executes the cache hit check (compressed cache hit check) of the compressed L2P table cache 32 (step S114) and the controller 4 determines whether the compressed L2P table cache 32 is a state of the cache hit (compressed cache hit) or a state of the cache miss (compressed cache miss), based on a result of the compressed cache hit check (step S115).

The compressed cache hit means a state in which compressed address translation data obtained by compressing the address translation data including the physical address corresponding to the logical address specified by the read command exists in the compressed L2P table cache 32. The compressed cache miss means a state in which the compressed address translation data does not exist in the compressed L2P table cache 32. Even if the compressed L2P table cache 32 is configured to have M+1 cache entries, the compressed cache miss may occur until compressed address translation data are cached in all the cache entries of the compressed L2P table cache 32.

In the L2P table cache 31, the cache entry is evicted from the L2P table cache 31 as necessary. For this reason, there is a case where the cache miss of the L2P table cache 31 occurs and the cache hit (compressed cache hit) of the compressed L2P table cache 32 occurs.

In this case, the controller 4 read-accesses the compressed L2P table cache 32 and reads the compressed address translation data from the compressed L2P table cache 32 (steps S116 and S117). In this case, an operation for reading the compressed address translation data from the compressed L2P table cache 32, a decode operation for decompressing the compressed address translation data, and an operation for transferring uncompressed address translation data obtained by the decode operation to the cache entry of the L2P table cache 31 can be executed by the decode-DMA controller 152. In addition, the controller 4 acquires the physical address corresponding to the logical address in the read command from the uncompressed address translation data transferred to the cache entry of the L2P table cache 31.

In addition, the controller 4 read-accesses the NAND type flash memory 5 using the physical address and reads the user data specified by the logical address in the read command from the NAND type flash memory 5 (steps S118 and S119). The controller 4 returns the user data to the host 2 (step S120).

Figure 10:
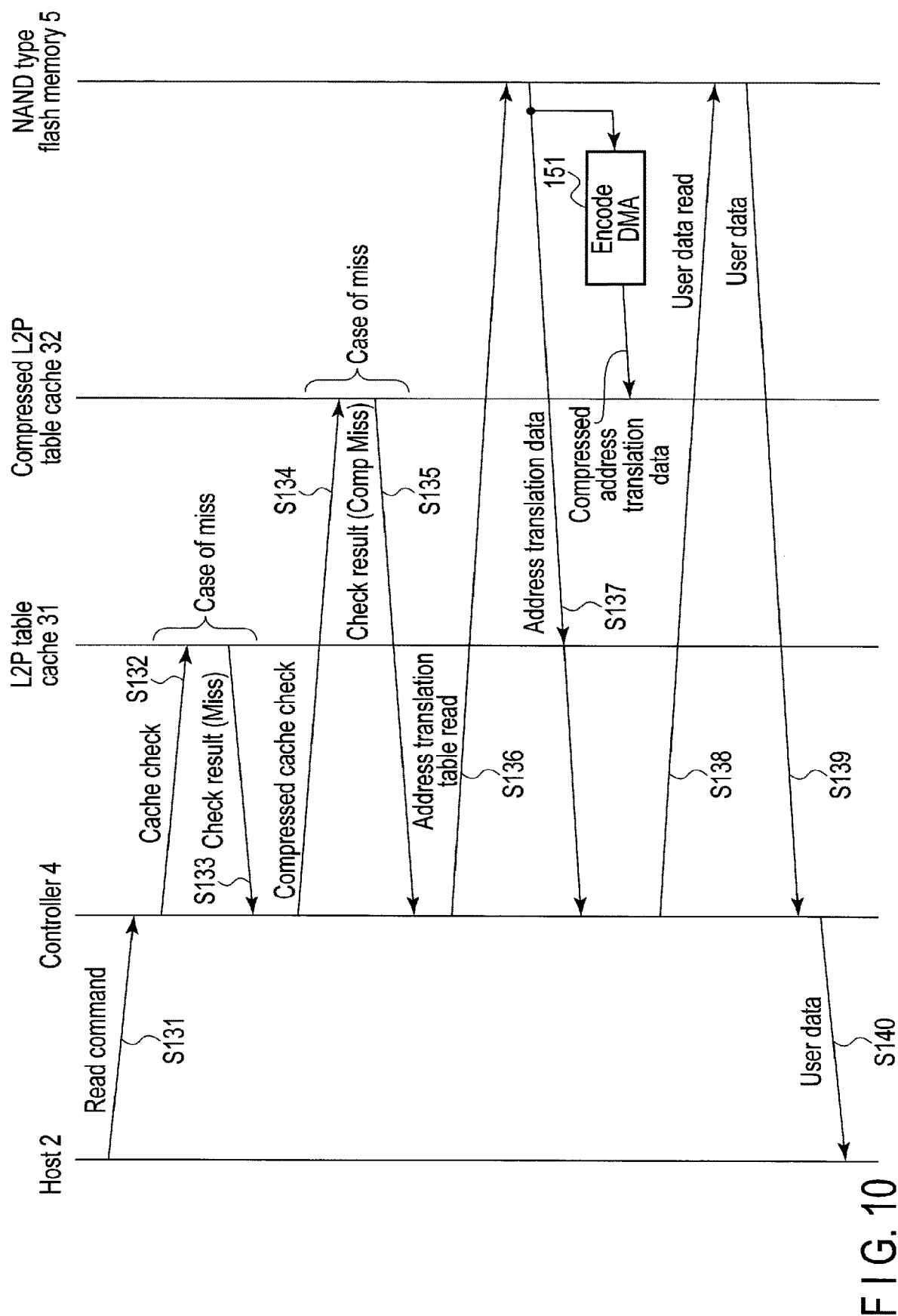
FIG. 10 is a diagram showing a processing sequence of cache control processing executed by the memory system according to the embodiment when a cache miss of the L2P table cache occurs and a cache miss of the compressed L2P table cache occurs.

FIG. 10 shows a processing sequence of cache control processing executed when the cache miss of the L2P table cache 31 occurs and the cache miss of the compressed L2P table cache 32 occurs.

The host 2 sends the read command to the SSD 3 (step S131). When the controller 4 receives the read command from the host 2, the controller 4 executes the cache hit check of the L2P table cache 31 (step S132) and the controller 4 determines whether the L2P table cache 31 is in a state of the cache hit or a state of the cache miss, based on a result of the cache hit check (step S133).

In the case of the cache miss, the controller 4 executes the cache hit check (compressed cache hit check) of the compressed L2P table cache 32 (step S134) and the controller 4 determines whether the compressed L2P table cache 32 is a state of the cache hit (compressed cache hit) or a state of the cache miss (compressed cache miss), based on a result of the compressed cache hit check (step S135).

In the case of the compressed cache miss, the controller 4 read-accesses the L2P table 7 in the NAND type flash memory 5 and executes an operation for reading the address translation data including the physical address corresponding to the logical address from the L2P table 7, an operation for storing the read address translation data in the L2P table cache 31, an operation for acquiring the physical address corresponding to the logical address in the read command from the read address translation data, and operation for storing the compressed address translation data obtained by compressing the read address translation data in the compressed L2P table cache 32 (steps S136 and S137). Compression transfer including an operation for reading the address translation data from the L2P table 7, an encode operation for compressing the read address translation data, and an operation for storing the compressed address translation data obtained by the encode operation in the compressed L2P table cache 32 can be executed by the encode-DMA controller 151.

In addition, the controller 4 read-accesses the NAND type flash memory 5 using the physical address and reads the user data specified by the logical address in the read command from the NAND type flash memory 5 (steps S138 and S139). The controller 4 returns the user data to the host 2 (step S140).

FIG. 11 shows a relation between the L2P table 7, the L2P table cache 31, and the compressed L2P table cache 32 and an arrangement example of the L2P table cache 31 and the compressed L2P table cache 32 on the DRAM 6.

As described above, when the cache miss occurs in both the L2P table cache 31 and the compressed L2P table cache 32, the address translation data is transferred from the L2P table 7 to both the L2P table cache 31 and the compressed L2P table cache 32. In this case, in the transfer of the address translation data from the L2P table 7 to the L2P table cache 31, the address translation data is stored in the cache entry of the L2P table cache 31 in an uncompressed state without being compressed. On the other hand, in the transfer of the address translation data from the L2P table 7 to the compressed L2P table cache 32, the address translation data is compressed by the compression transfer by the encode-DMA controller 151 and the compressed address translation data is stored in the cache entry of the compressed L2P table cache 32.

A right part of FIG. 11 shows an arrangement example of the L2P table cache 31 and the compressed L2P table cache 32 on the DRAM 6.

The controller 4 secures a region 61 for the compressed L2P table cache 32 in a memory region (L2P Cache RAM) for the logical-to-physical address translation on the DRAM 6, such that the compressed L2P table cache 32 has a maximum size capable of holding the compressed address translation data for the logical-to-physical address translation for all the logical addresses of the SSD 3, and uses the remaining region 62 of the L2P cache RAM as the L2P table cache 31.

The compressed L2P table cache 32 includes the same number of cache entries as the number of entries in the L2P table 7. When a region number of the final entry of the L2P table 7 is indicated by RegionMax, a region number of the final cache entry of the compressed L2P table cache 32 is also indicated by RegionMax. That is, the compressed L2P table cache 32 includes RegionMax+1 cache entries and the region 61 is used to store compressed address translation data (Compressed L2P Map Data) corresponding to the RegionMax+1 cache entries.

A cache ID of the final cache entry of the L2P table cache 31 is represented by Max Cache ID'. If a cache ID of the final cache entry of the L2P table cache 31 when the entire L2P cache RAM is used as the L2P table cache 31 is set to Max Cache ID, a relation of Max Cache ID'<Max Cache ID is satisfied.

That is, the L2P table cache 31 includes Max Cache ID'+1 cache entries and the region 62 is used to store address translation data (L2P Translate Cache Line Data) corresponding to the Max Cache ID'+1 cache entries, and Max Cache ID'+1 tags (Cache Tag).

A capacity of the L2P Cache RAM can be represented by the following formula.

$$L2P\ Cache\ RAM = MaxCacheId' \times (size\ of\ (CacheLine) + size\ of\ (CacheTag)) + RegionMax \times size\ of\ (Compressed\ L2P\ Address\ Map\ Line)$$

Here, RegionMax×size of (Compressed L2P Address Map Line) indicates a size of the compressed L2P table cache 32, that is, a size of the region 61. MaxCacheId'×(size of (CacheLine)+size of (CacheTag)) indicates a size of the L2P table cache 31, that is, a size of the region 62.

On the other hand, if L2P Cache RAM is represented by MaxCacheId, L2P Cache RAM=MaxCacheId×(size of (CacheLine)+size of (CacheTag)) is satisfied, so that Max Cache ID' can be represented by the following formula.

$$Max\ Cache\ Id' = Max\ Cache\ Id - RegionMax \times size\ of\ (Compressed\ L2P\ Address\ Map\ Line)/(size\ of\ (CacheLine) + size\ of\ (CacheTag))$$

Because a compression rate CompressRate indicates size of (Compressed L2P Address Map Line)/size of (Cache Line), MaxCacheId can be approximated as follows if size of (CacheLine)>>size of (CacheTag) is satisfied.

$$Max\ Cache\ Id' \approx Max\ Cache\ Id - RegionMax \times CompressRate$$

As described above, in the configuration in which the compressed L2P table cache 32 of the fixed size (maximum size) is assigned to the L2P cache RAM and the L2P table cache 31 is secured in the remainder, if the size of the L2P cache RAM is fixed as shown in FIG. 11, the size of the L2P table cache 31 inevitably decreases.

For this reason, even in a state where the compressed L2P table cache 32 is not yet filled with the compressed address translation data, the cache entry of the L2P table cache 31 is easily evicted. As a result, the cache hit rate of the L2P table cache 31 may decrease.

Therefore, in this embodiment, the controller 4 assigns the compressed L2P table cache 32 of the variable length to the L2P cache RAM.

More specifically, the controller 4 changes the size of the compressed L2P table cache 32 from the initial size to the maximum size, such that the size of the compressed L2P table cache 32 increases dynamically as an amount of compressed address translation data cached in the compressed L2P table cache 32 increases, and uses both an unused region 61a in the region 61 and the region 62 as the L2P table cache 31 until the size of the compressed L2P table cache 32 increases to the maximum size (that is, until almost the entire compressed L2P table cache 32 is filled with the compressed address translation data).

Thereby, the size of the L2P table cache 31 can be increased relatively large and it is difficult to cause the cache entry of the L2P table cache 31 to be evicted until almost the entire compressed L2P table cache 32 is filled with the compressed address translation data. As a result, the cache hit rate of the L2P table cache 31 can be increased.

Figure 12:
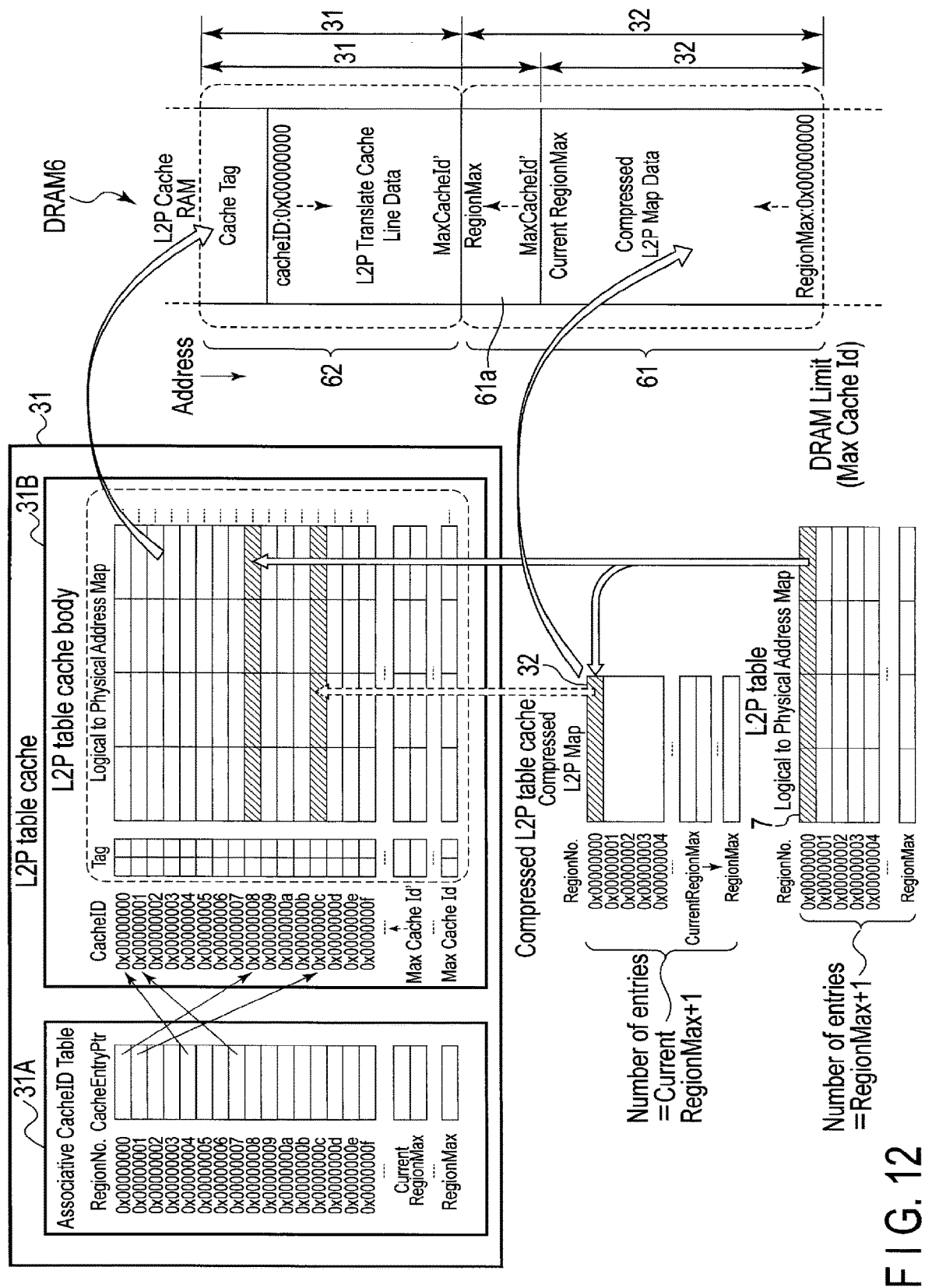
FIG. 12 is a diagram showing a relation between the L2P table, the L2P table cache, and the compressed L2P table cache and another arrangement another example of the L2P table cache and the compressed L2P table cache on the random access memory.

FIG. 12 shows an arrangement example of the L2P table cache 31 and the compressed L2P table cache 32 on the DRAM 6 in the case where the compressed L2P table cache 32 of the variable length is used.

The size of the compressed L2P table cache 32 increases from the initial size to the maximum size as described above. First, the size of the compressed L2P table cache 32 is set to the initial size. When the size of the compressed L2P table cache 32 is the initial size, the region number of the final cache entry of the compressed L2P table cache 32 is indicated by CurrentRegionMax. That is, the compressed L2P table cache 32 includes CurrentRegionMax+1 cache entries and the region 61 is used to store compressed address translation data (Compressed L2P Map Data) corresponding to the CurrentRegionMax+1 cache entries.

When the size of the compressed L2P table cache 32 is the initial size, the controller 4 uses both the unused region 61a in the region 61 and the region 62 as the L2P table cache 31.

In other words, the L2P table cache 31 includes Max Cache ID'+1 cache entries, but a value of Max Cache ID' becomes larger than Max Cache ID' of FIG. 11. Both the region 62 and the unused region 61a are used to store address translation data (L2P Translate Cache Line Data) corresponding to the Max Cache ID'+1 cache entries and Max Cache ID'+1 tags (Cache Tag).

If the amount of compressed address translation data cached in the compressed L2P table cache 32 increases and the CurrentRegionMax+1 cache entries are substantially filled with the compressed address translation data, a value of CurrentRegionMax increases. CurrentRegionMax can increase to RegionMax. The size of the compressed L2P table cache 32 when CurrentRegionMax reaches RegionMax is the maximum size described above.

As the value of CurrentRegionMax increases, the value of Max Cache ID' decreases.

The size of the compressed L2P table cache 32 may increase stepwise from the initial size to the maximum size. For example, when the compressed L2P table cache 32 including about 10 initial cache entries on the region 61 is secured on the region 61 and about 10 cache entries are substantially filled with the compressed address translation data, the controller 4 may increase the number of cache entries in the compressed L2P table cache 32 to about 20 in total. When about 20 cache entries in total are substantially filled with the compressed address translation data, the controller 4 may increase the number of cache entries to about 20 in total. In this way, the size of the compressed L2P table cache 32, that is, the number of cache entries increases stepwise from the initial size to the maximum size.

A capacity of the L2P Cache RAM can be represented by the following formula.

$$L2P \text{ Cache RAM} = \text{MaxCacheId} \times (\text{size of (CacheLine)} + \text{size of (CacheTag)}) + \text{CurrentRegionMax} \times \text{size of (Compressed L2P Address Map Line)}$$

Even in FIG. 12, if the L2P Cache RAM is represented by MaxCacheId as in FIG. 11, L2P Cache RAM=MaxCacheId'=(size of (CacheLine)+size of (CacheTag)) is satisfied, so that Max Cache ID' can be represented by the following formula.

$$\text{Max Cache Id}' = \text{Max Cache Id} - \text{CurrentRegionMax} \times \text{size of (Compressed L2P Address Map Line)} / (\text{size of (CacheLine)} + \text{size of (CacheTag)})$$

Here, even in FIG. 12, similar to FIG. 11, (size of (CacheLine)+size of (CacheTag) indicates a sum of a size of a cache entry (cache line) of the L2P table cache 32 and a size of a cache tag corresponding to the cache entry.

In addition, a condition of size of (CacheLine)>>size of (CacheTag) is not changed and Max Cache ID' can be approximated by the following formula at a compression rate CompressRate.

$$\text{Max Cache Id}' \approx \text{Max Cache Id} - \text{CurrentRegionMax} \times \text{CompressRate}$$

In this embodiment, by using the unused region 61a of the region 61 as the L2P table cache 31 such that CurrentRegionMax<RegionMax is satisfied, the size of the L2P table cache 31 can be increased relatively large and the cache hit rate of the L2P table cache 31 can be increased.

An occupied region of the compressed L2P table cache 32 is secured from the side opposite to the L2P table cache 31 when viewed from a direction where the address of the DRAM 6 increases.

That is, the compressed L2P table cache 32 is disposed on the region 61 such that the cache entries between the cache entry corresponding to the region number 0x00000000 and the cache entry corresponding to CurrentRegionMax are arranged from an end of the region 61 to a boundary between the region 61 and the region 62. The end of the region 61 is located at the side opposite to the boundary between the region 61 and the region 62.

On the other hand, in the L2P table cache 31, the cache tag is disposed on an end of the region 62 located at the side opposite to the boundary between the region 62 and the region 61. Following the cache tag, the cache entries between the cache entry corresponding to 0x00000000 and the cache entry corresponding to Max Cache ID' are disposed.

As such, the controller 4 disposes the L2P table cache 31 and the compressed L2P table cache 32 on the L2P Cache RAM of the DRAM 6, such that the region (occupied region of the compressed L2P table cache 32) used as the compressed L2P table cache 32 increases in a direction from the end of the region 61 toward the boundary between the region 61 and the region 62 and the region (occupied region of the L2P table cache 31) used as the L2P table cache 31 increases in the direction from the end of the region 62 toward the boundary between the region 61 and the region 62.

Normally, a range of logical addresses accessed by the host 2 increases with time, and a use capacity of the SSD 3 increases. In this embodiment, as described above, the occupied region of the compressed L2P table cache 32 is secured from the side opposite to the L2P table cache 31 when viewed from the direction where the address of the DRAM 6 increases. Therefore, it is possible to easily increase the size of the compressed L2P table cache 32 according to an increase in the amount of data in the compressed L2P table cache 32.

As described above, according to this embodiment, a part of the contents of the L2P table 7 stored in the NAND type flash memory 5 is stored in the DRAM 6 as the L2P table cache 31 and the compressed address translation data obtained by compressing the contents of the L2P table 7 is stored in the DRAM 6 as the compressed L2P table cache 32.

When the address translation data including the physical address corresponding to the logical address specified by the host exists in the L2P table cache 31 on the DRAM 6, the physical address corresponding to the logical address specified by the host is acquired from the address translation data in the L2P table cache 31.

When the address translation data does not exist in the L2P table cache 31 and the compressed address translation data corresponding to the address translation data exists in the compressed L2P table cache 32 on the DRAM 6, an operation for storing uncompressed address translation data obtained by decompressing the compressed address translation data in the compressed L2P table cache 32 in the L2P table cache 31 and an operation for acquiring the physical address corresponding to the logical address specified by the host from the uncompressed address translation data are executed.

When the address translation data does not exist in the L2P table cache 31 and the compressed address translation data does not exist in the compressed L2P table cache 32, an operation for reading the address translation data from the L2P table 7 in the NAND type flash memory 5, an operation for storing the read address translation data in the L2P table cache 31, an operation for acquiring the physical address corresponding to the logical address specified by the host from the read address translation data, and an operation for storing the compressed address translation data obtained by compressing the read address translation data in the compressed L2P table cache 32 are executed.

As such, the L2P table cache 31 and the compressed L2P table cache 32 are disposed on the random access memory such as the DRAM 6, so that it is possible to increase the probability of accessing the random access memory that can be accessed at higher speed than the NAND type flash memory 5, not accessing the L2P table 7 in the NAND type flash memory 5. Therefore, performance of the logical-to-physical address translation can be improved and performance of the SSD 3 can be improved.

In this embodiment, the NAND type flash memory is exemplified as the nonvolatile memory. However, the functions according to this embodiment can be applied to a variety of other nonvolatile memories such as a magnetoresistive random access memory (MRAM), a phase change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
   a nonvolatile memory; and
   a controller electrically connected to the nonvolatile memory and configured to store a part of contents of a logical-to-physical address translation table stored in the nonvolatile memory in a random access memory as a first cache, and store compressed address translation data obtained by compressing the contents of the logical-to-physical address translation table in the random access memory as a second cache,
   wherein the controller is configured to:
   execute, when first address translation data including a first physical address indicating a physical storage location of the nonvolatile memory where data corresponding to a first logical address specified by the host is stored does not exist in the first cache and first compressed address translation data corresponding to the first address translation data exists in the second cache, an operation for storing uncompressed address translation data obtained by decompressing the first compressed address translation data in the second cache in the first cache and an operation for acquiring the first physical address from the uncompressed address translation data; and
   execute, when the first address translation data does not exist in the first cache and the first compressed address translation data does not exist in the second cache, an operation for reading the first address translation data from the logical-to-physical address translation table, an operation for storing the read first address translation data in the first cache, an operation for acquiring the first physical address from the read first address translation data, and an operation for storing compressed address translation data obtained by compressing the read first address translation data in the second cache.

2. The memory system according to claim 1, wherein the second cache has a size capable of holding compressed address translation data for logical-to-physical address translation for all logical addresses of the memory system.

3. The memory system according to claim 1, wherein the controller is configured to secure a first region for the second cache on the random access memory, such that the second cache has a first size capable of holding compressed address translation data for logical-to-physical address translation for all logical addresses of the memory system, and use the remaining second region of the random access memory as the first cache.

4. The memory system according to claim 3, wherein the controller is configured to change a size of the second cache from an initial size to the first size, such that the size of the second cache increases as an amount of compressed address translation data cached in the second cache increases, and use both an unused region in the first region and the second region as the first cache until the size of the second cache increases to the first size.

5. The memory system according to claim 4, wherein the controller is configured to dispose the first cache and the second cache on the random access memory, such that a region used as the second cache increases in a direction from an end of the first region toward a boundary between the first region and the second region and a region used as the first cache increases in a direction from an end of the second region toward the boundary.

6. The memory system according to claim 1, wherein
   the controller comprises a decoder circuit that decompresses compressed data and an encoder circuit that compresses data, and
   the controller is configured to
   when the first address translation data does not exist in the first cache and the first compressed address translation data corresponding to the first address translation data exists in the second cache, decompress the first compressed address translation data by the decoder circuit, and
   when the first address translation data does not exist in the first cache and the first compressed address translation data does not exist in the second cache, compress the read first address translation data by the encoder circuit.

7. The memory system according to claim 1, wherein
   the first cache comprises a plurality of cache entries and each cache entry of the first cache stores address translation data including a plurality of physical addresses corresponding to a plurality of consecutive logical addresses, and
   the second cache comprises a plurality of cache entries and each cache entry of the second cache stores compressed address translation data obtained by compressing the address translation data including the physical addresses.

8. A method of controlling a nonvolatile memory in a memory system, the method comprising:
   storing a part of contents of a logical-to-physical address translation table stored in the nonvolatile memory in a random access memory as a first cache and storing compressed address translation data obtained by compressing the contents of the logical-to-physical address translation table in the random access memory as a second cache;
   executing, when first address translation data including a first physical address indicating a physical storage location of the nonvolatile memory where data corresponding to a first logical address specified by a host is stored does not exist in the first cache and first compressed address translation data corresponding to the first address translation data exists in the second cache, an operation for storing uncompressed address translation data obtained by decompressing the first compressed address translation data in the second cache in the first cache and an operation for acquiring the first physical address from the uncompressed address translation data; and
   executing, when the first address translation data does not exist in the first cache and the first compressed address translation data does not exist in the second cache, an operation for reading the first address translation data from the logical-to-physical address translation table, an operation for storing the read first address translation data in the first cache, an operation for acquiring the first physical address from the read first address translation data, and an operation for storing compressed address translation data obtained by compressing the read first address translation data in the second cache.

9. The method according to claim 8, wherein the second cache has a size capable of holding compressed address translation data for logical-to-physical address translation for all logical addresses of the memory system.

10. The method according to claim 8, further comprising:
   securing a first region for the second cache on the random access memory, such that the second cache has a first size capable of holding compressed address translation data for logical-to-physical address translation for all logical addresses of the memory system; and
   using the remaining second region of the random access memory as the first cache.

11. The method according to claim 10, further comprising:
   changing a size of the second cache from an initial size to the first size, such that the size of the second cache increases as an amount of the compressed address translation data cached in the second cache increases; and
   using both an unused region in the first region and the second region as the first cache until the size of the second cache increases to the first size.

\* \* \* \* \*